United States Patent
Yabe

(10) Patent No.: US 8,760,693 B2
(45) Date of Patent: Jun. 24, 2014

(54) IMAGE PROCESSING APPARATUS, CONTROL METHOD FOR IMAGE PROCESSING APPARATUS, AND STORAGE MEDIUM FOR CORRECTING DENSITY USING A REUSABLE OBJECT

(75) Inventor: Takashi Yabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 267 days.

(21) Appl. No.: 13/221,186

(22) Filed: Aug. 30, 2011

(65) Prior Publication Data

US 2012/0057198 A1 Mar. 8, 2012

(30) Foreign Application Priority Data

Sep. 8, 2010 (JP) ................... 2010-201084

(51) Int. Cl.
*G06K 15/02* (2006.01)
(52) U.S. Cl.
USPC ............ 358/1.15; 358/1.1; 358/1.9; 358/3.27
(58) Field of Classification Search
USPC ........ 358/1.1, 1.9, 3.24, 3.27, 1.15, 518, 448, 358/464
See application file for complete search history.

(56) References Cited

U.S. PATENT DOCUMENTS

| | | | |
|---|---|---|---|
| 6,215,968 B1 * | 4/2001 | Uehara et al. | 399/49 |
| 6,930,790 B1 | 8/2005 | Forthoffer | |
| 7,583,408 B2 * | 9/2009 | Maeda et al. | 358/1.9 |
| 2007/0268502 A1 | 11/2007 | McCarthy | |
| 2009/0244574 A1 * | 10/2009 | Sakabe | 358/1.9 |
| 2010/0045987 A1 | 2/2010 | Bonikowski | |

FOREIGN PATENT DOCUMENTS

| | | |
|---|---|---|
| CN | 1924721 A | 3/2007 |
| EP | 1139655 A1 | 10/2001 |
| EP | 1262749 A2 | 12/2002 |
| EP | 1652668 A1 | 5/2006 |
| JP | 2003-195584 A | 7/2003 |
| JP | 2005-022298 A | 1/2005 |
| JP | 2005-022298 A | 1/2005 |
| JP | 2006-293129 A | 10/2006 |

* cited by examiner

Primary Examiner — Thomas D Lee

(74) Attorney, Agent, or Firm — Canon USA, Inc., IP Division

(57) ABSTRACT

An image processing apparatus includes a determination unit configured to determine whether a repetitive object is appropriate for being measured for density correction, a decision unit configured to decide, from pages including the repetitive object determined as appropriate for being measured for the density correction, a plurality of measurement pages to be measured for the density correction and a measurement position in the measurement pages, a measurement unit configured to measure density of the measurement position in the printed measurement pages, and a density correction unit configured to perform the density correction according to the measured density in the measurement pages for a page different from the measurement pages.

10 Claims, 22 Drawing Sheets

| MEASUREMENT PORTION | MEAN DENSITY | DETERMINATION RESULT |
|---|---|---|
| 1501 | 100 | ○ |
| 1502 | 100 | ○ |
| 1503 | 100 | ○ |
| 1504 | 100 | ○ |
| 1505 | 100 | ○ |
| 1506 | 100 | ○ |
| 1507 | 100 | ○ |
| 1508 | 100 | ○ |
| 1509 | 100 | ○ |
| 1510 | 100 | ○ |

| MEASUREMENT PORTION | MEAN DENSITY | DETERMINATION RESULT |
|---|---|---|
| 1501 | 0 | × |
| 1502 | 0 | × |
| 1503 | 0 | × |
| 1504 | 0 | × |
| 1505 | 0 | × |
| 1506 | 0 | × |
| 1507 | 0 | × |
| 1508 | 0 | × |
| 1509 | 0 | × |
| 1510 | 0 | × |

| MEASUREMENT PORTION | MEAN DENSITY BEFORE OVERLAP | MEAN DENSITY AFTER OVERLAP | DETERMINATION RESULT |
|---|---|---|---|
| 1501 | 100 | 100 | ○ |
| 1502 | 100 | 150 | × |
| 1503 | 100 | 120 | × |
| 1504 | 100 | 130 | × |
| 1505 | 100 | 100 | ○ |
| 1506 | 100 | 100 | ○ |
| 1507 | 100 | 100 | ○ |
| 1508 | 100 | 100 | ○ |
| 1509 | 100 | 100 | ○ |
| 1510 | 100 | 100 | ○ |

| MEASUREMENT PORTION | START POINT | | END POINT | |
|---|---|---|---|---|
| | X1 | Y1 | X2 | Y2 |
| 1501 | 3300 | 780 | 3620 | 1100 |
| 1502 | 3300 | 1100 | 3620 | 1420 |
| 1503 | 3300 | 1420 | 3620 | 1740 |
| 1504 | 3300 | 1740 | 3620 | 2060 |
| 1505 | 3300 | 2060 | 3620 | 2380 |
| 1506 | 3300 | 2380 | 3620 | 2700 |
| 1507 | 3300 | 2700 | 3620 | 3020 |
| 1508 | 3300 | 3020 | 3620 | 3340 |
| 1509 | 3300 | 3340 | 3620 | 3660 |
| 1510 | 3300 | 3660 | 3620 | 3980 |

FIG.19

| CORRECTION VALUE | DENSITY ADJUSTMENT VALUE |
|---|---|
| 20 | -2 |
| 10 | -1 |
| 0 | 0 |
| -10 | +1 |
| -20 | +2 |

IMAGE PROCESSING APPARATUS, CONTROL METHOD FOR IMAGE PROCESSING APPARATUS, AND STORAGE MEDIUM FOR CORRECTING DENSITY USING A REUSABLE OBJECT

BACKGROUND OF THE INVENTION

1. Field of the Invention

The present invention relates to an image processing apparatus capable of correcting density by using a reusable object, a control method for such an image processing apparatus, and a storage medium. The reusable object is a repetitive object which can be referenced a plurality of times and is used in variable data printing (VDP).

2. Description of the Related Art

In recent years, according to the expansion of one-to-one marketing, direct mails, which are useful in providing needs-matched information to customers, are becoming popular. Direct mails contain data such as variable data. A special page description language for VDP, typified by Personalized Print Markup Language (PPML), is used when variable data of a direct mail is printed.

The VDP data includes three elements: a reusable object, a number of variable objects, and page description language. The reusable object is repeatedly used in a plurality of pages. The variable object includes information which can be changed page by page such as customer information. The page description language defines the nature of the document information. The reusable data in this context denotes the repetitive object.

Further, regarding presentation application such as Microsoft PowerPoint, the same background object is repeatedly used in a number of pages. Normally, since a background object, which is common to all the pages, needs to be repeatedly processed, processing before printing takes time. Under such circumstances, a controller that enables high-speed printing has been developed and is on the market. When a background including the same object is repeatedly used, this controller processes the background image, stores the obtained result, and uses the stored processing-completed object each time the object is used. The background object denotes the repetitive object.

Nowadays, electrophotography is a widely-used method for printing. Since density stability of electrophotography is unstable compared to printing using ink, a technique that allows correction of density by preparing data other than print data, and measuring the change in the prepared data during printing has been developed.

For example, Japanese Patent Application Laid-Open No. 2006-293129 discusses a technique for determining and controlling execution of correction operations related to image forming conditions of an image forming apparatus. According to this technique, the same image is periodically formed and output on print paper. Then, a detected reference image and an image-formed state of the same image are compared. Based on the comparison result, the correction operation is performed. This technique reduces the density variation by correcting the density at regular intervals. Further, Japanese Patent Application Laid-Open No. 2003-195584 discusses a technique that enables simple measurement of an image, not yet completed, on the intermediate transfer member so as to reduce the density variation.

However, according to the technique discussed in Japanese Patent Application Laid-Open No. 2006-293129, since the image for density correction needs to be printed, extra print paper for correcting the density, which is irrelevant to the print job, becomes necessary.

Further, according to the above-described Japanese Patent Application Laid-Open No. 2003-195584, the density variation is measured during the print job. Since image forming needs to be performed while the job is performed, extra toner will be used. Furthermore, according to the method discussed in Japanese Patent Application Laid-Open No. 2003-195584, since the density variation is determined not by the image printed on paper but by the intermediate transfer member, the measurement accuracy is reduced compared to when the density is measured on paper.

SUMMARY OF THE INVENTION

The present invention is directed to an image processing apparatus which is capable of realizing simple and accurate density variation correction without using extra toner or print paper by performing density measurement using printed material of a repetitive object.

According to an aspect of the present invention, an image processing apparatus includes a printing unit configured to print a print job including a repetitive object, which is repeatedly used in a plurality of pages, a determination unit configured to determine whether the repetitive object is appropriate for being measured for density correction, a decision unit configured to decide, from pages including the repetitive object determined as appropriate for being measured for the density correction, a plurality of measurement pages to be measured for the density correction and a measurement position in the measurement pages, a measurement unit configured to measure density of the measurement position in the measurement pages printed by the printing unit, and a density correction unit configured to perform the measured density correction according to the measured density in the measurement pages for a page different from the measurement pages.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments, features, and aspects of the invention and, together with the description, serve to explain the principles of the invention.

FIG. 19 illustrates an example of a relation between a correction value and a density adjustment value.

DESCRIPTION OF THE EMBODIMENTS

Various embodiments, features, and aspects of the invention will be described in detail below with reference to the drawings.

Figure 1:
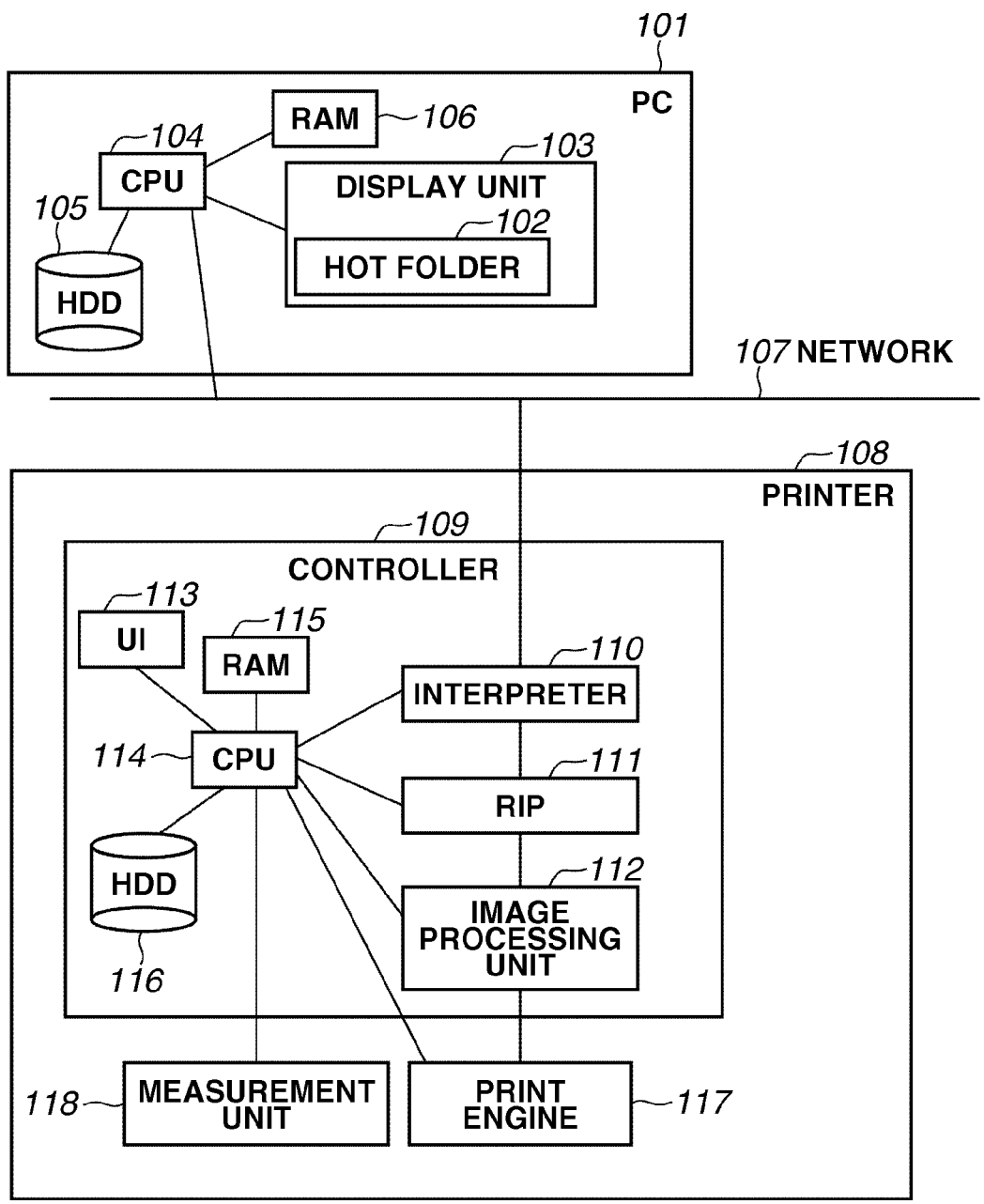
FIG. 1 is a block diagram illustrating a configuration of a VDP system applied to an embodiment of the present invention.

FIG. 1 is a block diagram illustrating a configuration of a VDP system applied to a first embodiment of the present invention. The VDP system includes a personal computer (PC) 101, which is an information processing apparatus, and a printer 108, which is an image processing apparatus. Further, the PC 101 and the printer 108 are connected for communication via a network 107.

The PC 101 includes a hot folder 102, a display unit 103, a central processing unit (CPU) 104, a hard disk drive (HDD) 105, and a random access memory (RAM) 106. The hot folder 102 is used for transmitting direct print data such as PPML to the printer 108 via the network 107. The display unit 103 displays a state of the PC 101. For example, a state of the hot folder 102 or the HDD 105 is displayed according to an instruction given by the CPU 104.

The CPU 104 is a central processing unit which is used when the PC 101 performs various types of processing. The HDD 105 stores various types of data such as data of the PC 101 and direct print data such as data in PPML. The data is read out and used. The RAM 106 is a storage unit that stores data which is used when the CPU 104 performs various types of calculation processing. The RAM 106 is used when various types of processing of the PC 101 is performed.

The printer 108 includes a controller 109, a print engine 117, and a measurement unit 118. The controller 109 includes an interpreter 110, a raster image processor (RIP) 111, an image processing unit 112, a UI 113, a CPU 114, a RAM 115, and an HDD 116. The interpreter 110 interprets/translates print data in page-description language (PDL), such as PPML, transmitted from the PC 101 via the network 107. The RIP 111 converts the print data which has been interpreted into bitmapped print data generated for each page. The image processing unit 112 converts the bitmapped print data into print data optimum for the print engine.

The UI 113 is configured to display various states of the printer 108 and is used when the user makes various settings for the printer. The CPU 114 is a central processing unit configured to perform various types of processing for the controller 109 and the print engine 117. The RAM 115 is a storage unit that stores data used for various types of calculation processing performed by the CPU 114. The RAM 115 is used when the CPU 114 performs various types of processing for the controller 109 and the print engine 117. The HDD 116 stores various types of data such as data of the controller 109 and the print engine 117 as well as print data. The data is read out and used.

The print engine 117 actually prints the print data generated by the controller 109. The measurement unit 118 measures the density which is used in the density correction of the printer.

Next, a basic operation of the VDP system illustrated in FIG. 1 will be described. First, the PC 101 generates PPML data by using an application (not illustrated) used for generating PPML language. The generated data is compressed into a ZIP file and stored in the HDD 105. The file can be stored in the hot folder 102 displayed by the display unit of the PC 101. If the user gives a print instruction, the PPML data is submitted to the printer 108 via the network 107. The submitted PPML data is interpreted by the interpreter 110 in the controller 109. Then, the interpreted data is converted into bitmap data for each page by the RIP 111.

The bitmap data is converted and corrected into print data optimum for the print engine by the image processing unit 112. The print data for the print engine is printed by the print engine 117. If density correction is necessary when the print engine 117 performs the printing, density correction patch data stored in the RAM 115 or the HDD 116 is read out and printed. Then, the measurement unit 118 of the printer 108 measures the density of the print data, and the CPU 114 calculates and generates a density correction table. Subsequently, the image processing unit 112 corrects the print data according to the density correction table. Accordingly, print data of appropriate density is output.

Figure 2:
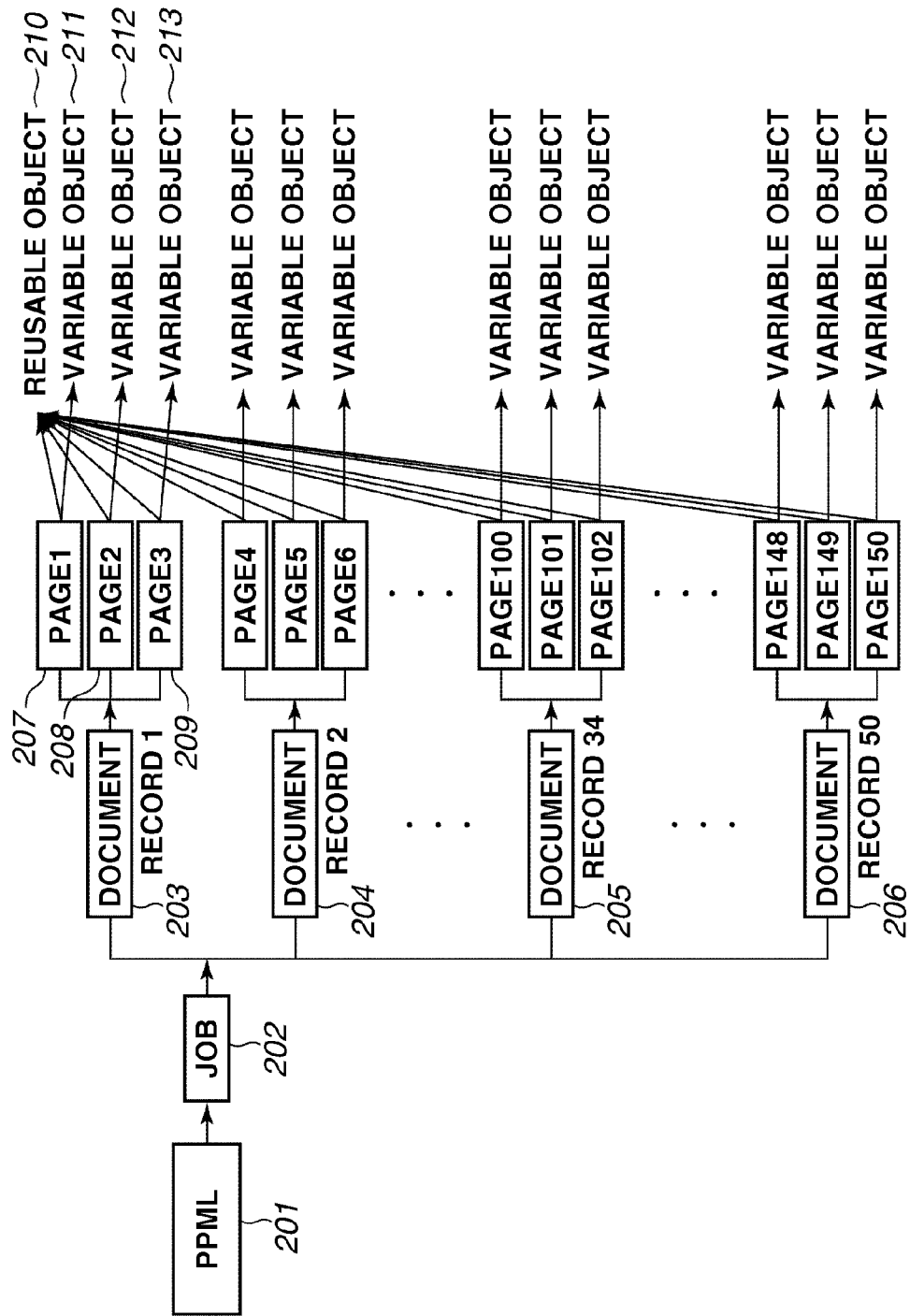
FIG. 2 illustrates a data structure of PPML data.

Next, data structure of the PPML data will be described with reference to FIG. 2. PPML data 201 is defined and managed according to a hierarchical structure. The structure includes a job 202, documents 203, 204, 205, and 206, pages 207, 208, 209, a reusable object 210, and variable objects 211, 212, and 213. The document 203 is managed as one unit that includes the pages 207, 208, and 209. This unit is called a record. Further, a job includes groups of records. The job in PPML illustrated in FIG. 2 includes 50 records. In FIG. 2, records 1, 2, 34, and 50 are illustrated out of the 50 records.

A page includes a reusable object and a variable object. As can be seen from FIG. 2, the reusable object 210 is referred to from each of the pages and is repeatedly used. Thus, it is called a repetitive object. Each of the variable objects 211, 212, and 213 is used only for the corresponding page.

Regarding the VDP, interpretation processing of the repetitive object is not performed for each page. The repetitive object is stored in the RAM or the HDD according to the first interpretation processing. After then, if the repetitive object is used again, the stored data is simply read out. Thus, the interpretation processing will not be performed for each page. Accordingly, processing time for each page is reduced and the performance is improved.

Figure 3:
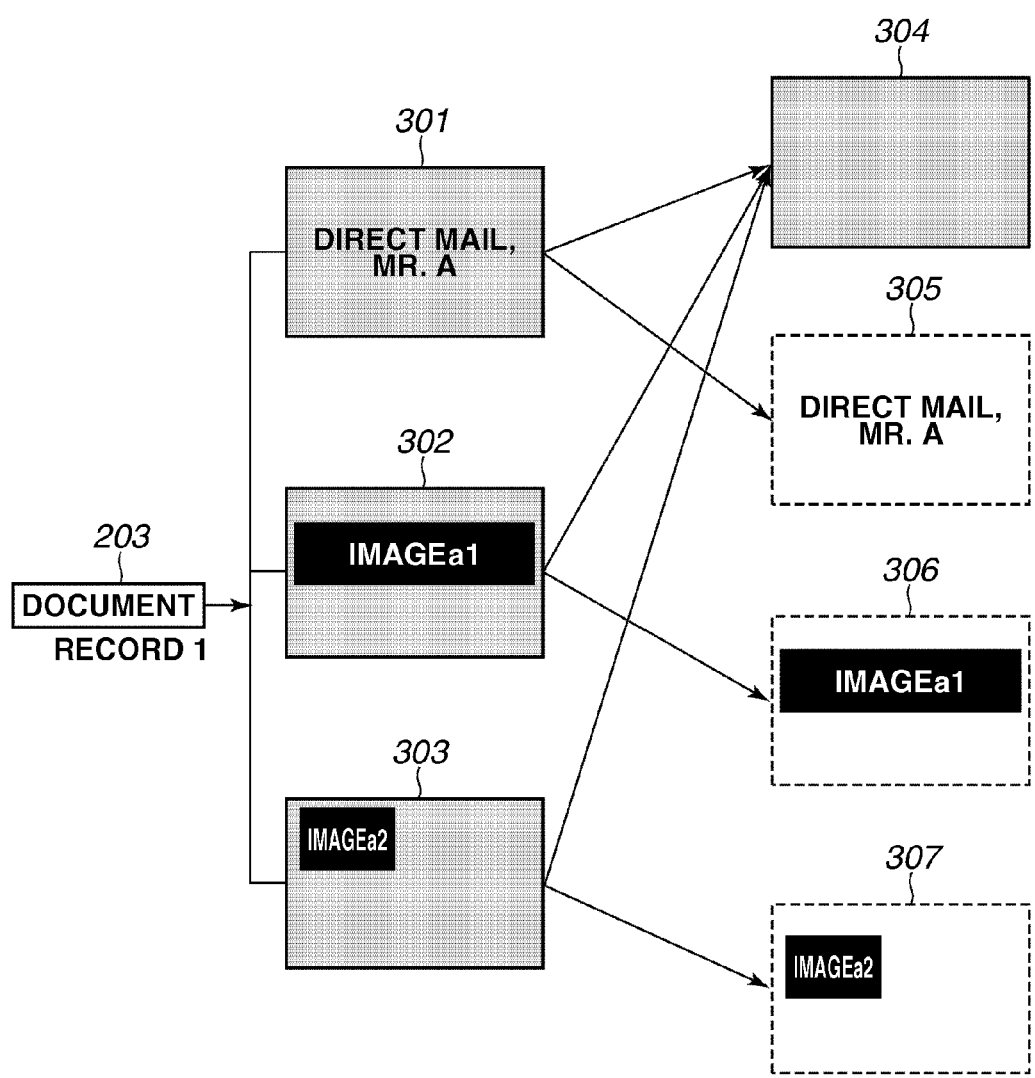
FIG. 3 illustrates a relation between a page image and an object.

FIG. 3 illustrates a relation between an actual page image and the object of record 1 having the structure illustrated in FIG. 2. The page image in page 1 includes a reusable object 304 and a variable object 305. This page is denoted as page 301. The page image in page 2 includes the reusable object 304 and a variable object 306. This page is denoted as page 302. The page image in page 3 includes the reusable object 304 and a variable object 307. This page is denoted as page 303. The reusable object 304 is repeatedly used, being used for each page. Thus, it is a repetitive object. Although the illustration of the repetitive object is simplified in FIG. 2, actually, it corresponds to the background of each page.

Figure 4:
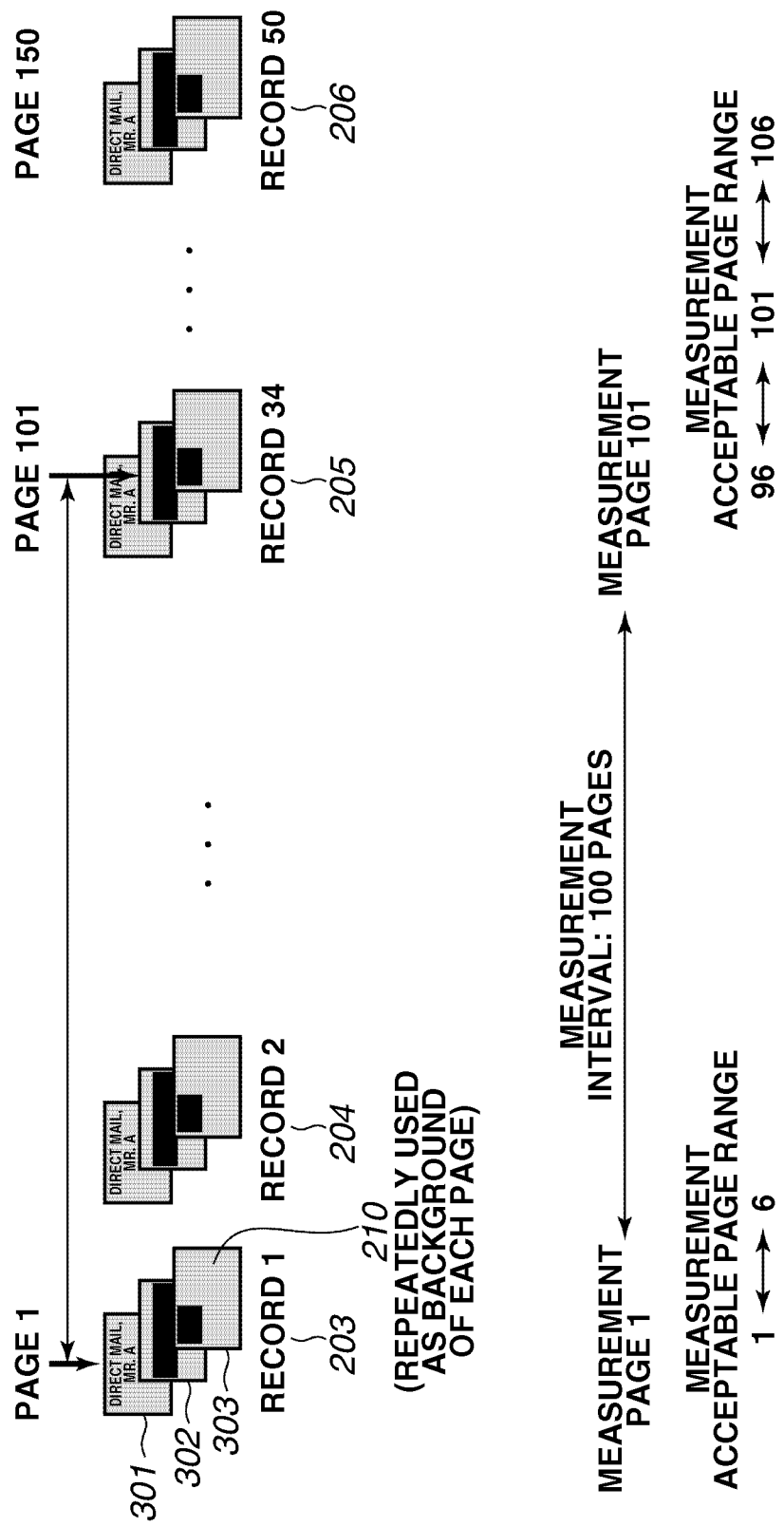
FIG. 4 illustrates an output image of a page image.

FIG. 4 illustrates an output image of the actual page image of the PPML data 201 in the structure illustrated in FIG. 2. As can be seen from FIG. 4, the reusable object 210 is repeatedly used as the background of each page.

Figure 5:
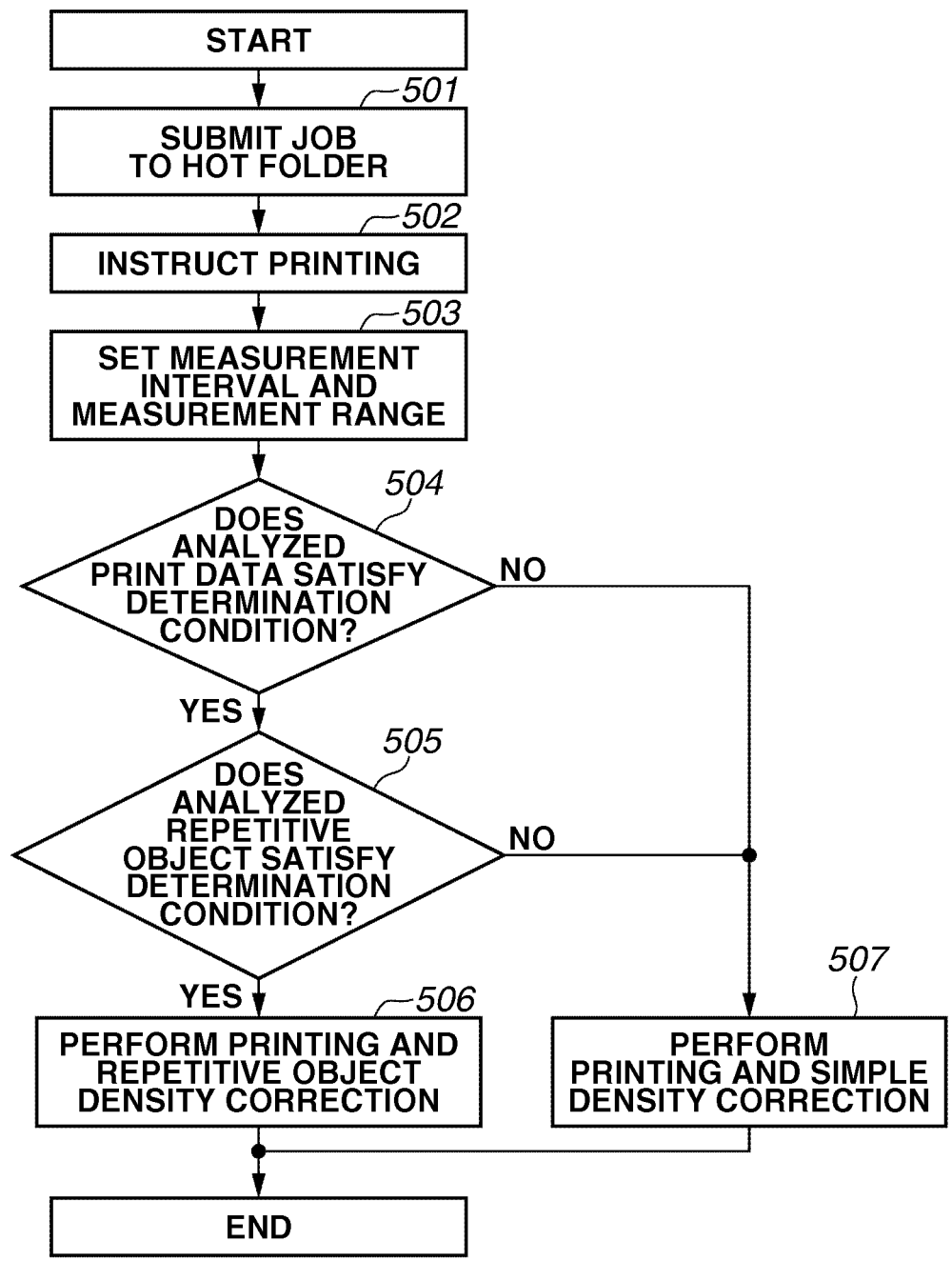
FIG. 5 is a flowchart illustrating an outline of density correction processing according to an embodiment of the present invention.

FIG. 5 is a flowchart illustrating the density correction processing using a repetitive object. In step 501, if a user gives an instruction via the display unit 103, the CPU 104 submits PPML data (a print job) to the hot folder 102. The PPML data has the structure described above with reference to FIG. 2 and will be described below.

In step 502, when the user gives a print instruction by operating the display unit 103, the CPU 104 transmits the PPML data from the PC 101 to the printer 108 via the network 107. In step 503, on receiving the print instruction from the PC 101, the CPU 114 sets a measurement interval and an acceptable range stored in advance in the RAM 115 in the program.

The measurement interval is the interval between one density correction and the next. The measurement interval is defined in advance according to the print engine, print paper, print environment, and durability status. The measurement interval can be also set by the user considering the status of the printer via the UI 113. According to the present embodiment, the measurement interval is set to 100 pages.

The acceptable range is a range of pages before and after a measurement page set by the measurement interval by the CPU 114. According to the present embodiment, the acceptable range corresponds to 10% of the measurement interval. Since the measurement interval is 100 pages in this case, the acceptable range will be 10 pages. To be more precise, the measurement interval is 5 pages before and after the measurement page. By setting the acceptable range, the density measurement using the repetitive object within the actual print data can be applied more frequently.

In step 504, the CPU 114 analyzes the PPML data, which is the print data received from the PC 101, and determines whether a repetitive object is included in the PPML data and whether the measurement interval condition is satisfied. Details of analysis and determination processing in step 504 will be described below with reference to FIG. 6. If the CPU 114 determines that the print data satisfies the determination conditions (YES in step 504), the processing proceeds to step 505. If the CPU 114 determines that the print data does not satisfy the determination conditions (NO in step 504), the processing proceeds to step 507.

In step 507, the PPML data is printed according to the control of the CPU 114. The density correction is performed without using printed paper and according to a conventional method. In other words, the density is corrected based on a patch of image on the intermediate transfer member. Step 507 is performed when the density correction cannot be performed by using a repetitive object. It is also a case where the density is corrected according to simple density correction.

In step 505, the CPU 114 performs the analysis and determination processing of the repetitive object. Details of the analysis and determination processing in step 505 will be described below with reference to FIG. 7. In step 505, if the CPU 114 determines that the repetitive object satisfies the condition (YES in step 505), the processing proceeds to step 506. If the CPU 114 determines that the repetitive object does not satisfy the condition (NO in step 505), the processing proceeds to step 507.

In step 506, the CPU 114 controls the interpreter 110, the RIP 111, and the image processing unit 112 so that the print data is sequentially processed by these units. Then, the print data is printed page by page according to the print engine 117. At that time, the CPU 114 controls the measurement unit 118 so that the measurement unit performs density measurement of the measurement page including the repetitive object. Then, the printing is performed while the density correction is performed. Details of the processing in step 506 will be described below with reference to FIG. 8.

Figure 6:
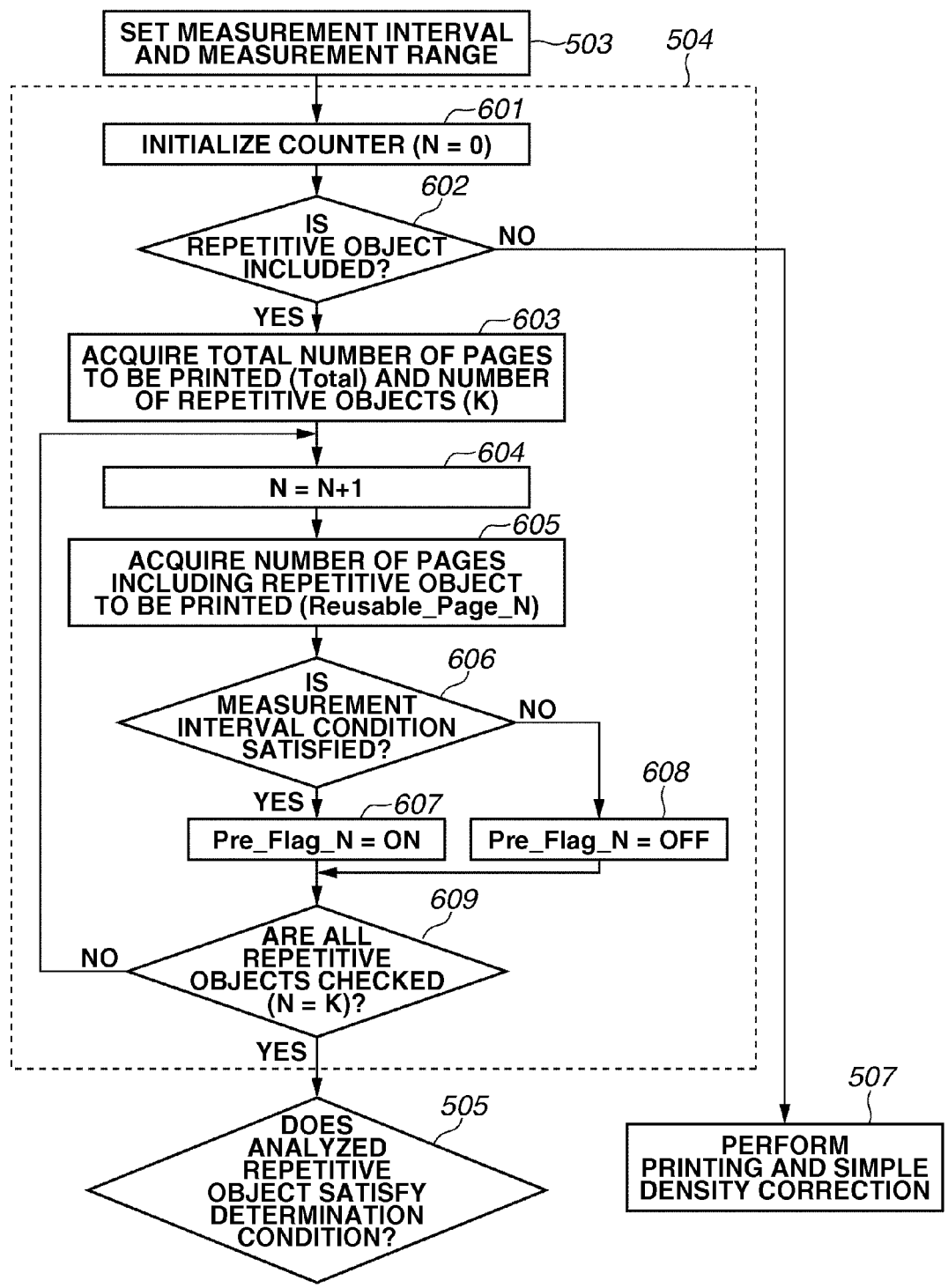
FIG. 6 is a flowchart illustrating detailed processing of data analysis and check processing.

FIG. 6 is a flowchart illustrating details of the analysis and determination processing of the PPML data (print job) performed in step 504. The measurement interval is set to 100 pages and the acceptable range is set to 10 pages as described above with reference to step 503.

In step 601, the CPU 114 performs initialization of a number N of a counter used for determining whether all the repetitive objects have been checked, and N is set to 0. In step 602, the CPU 114 analyzes the structure of the received PPML data and determines whether a repetitive object is included in the data. For example, if the PPML data illustrated in FIG. 2 is analyzed, since the reusable object 210 is a repetitive object, the CPU 114 determines that a repetitive object is included (YES in step 602), and the processing proceeds to step 603. On the other hand, if the CPU 114 determines that a repetitive object is not included (NO in step 602), the processing proceeds to step 507.

In step 603, the CPU 114 acquires a total number of pages to be printed (Total) of the print job and a number K of repetitive objects. For example, regarding the PPML data in FIG. 2, the CPU 114 determines that the total number of pages to be printed (Total) is 150 pages and the number K of repetitive objects is one (one reusable object 210).

In step 604, the CPU 114 increments the number N of the counter by 1. In step 605, the CPU 114 confirms "Reusable_page_N". "N" indicates the number of pages including the repetitive object to be printed. The N-th repetitive object is the check target and is hereinafter referred to as the target repetitive object. For example, when the analysis of the print job is started, "Reusable_page_1", which indicates the first repetitive object to be printed, will be confirmed. If the CPU 114 analyzes the PPML data illustrated in FIG. 2, since the reusable object 210 is used in all the pages of the print job, the number of pages including the reusable object 210 will be 150.

In step 606, the CPU 114 determines whether the target repetitive object satisfies the measurement interval condition which has been set. The measurement is performed according to the measurement interval set for the total number of pages to be printed (Total) only when "Total/measurement interval" is smaller than the number of pages including the repetitive object to be printed. Thus, if the number of pages including the target repetitive object to be printed is greater than "Total/measurement interval", the CPU 114 determines that the measurement interval condition is satisfied. On the other hand, if the number of pages including the target repetitive object to be printed is smaller than or equal to "Total/measurement interval", the CPU 114 determines that the measurement interval condition is not satisfied.

According to the PPML data in FIG. 2, the total number of pages to be printed (Total) is 150, the number of pages including the repetitive object to be printed is 150, and the measurement interval is 100. Since Total/measurement interval is 1.5 and is smaller than 150, it is determined that the condition is satisfied. On the other hand, for example, if the measurement interval is 50, the total number of pages to be printed (Total) is 150, and the number of pages including the repetitive object to be printed is 2, Total/measurement interval is 3, and is greater than 2. Thus, it is determined that the condition is not satisfied. If the CPU 114 determines that the condition is satisfied (YES in step 606), the processing proceeds to step

607. If the CPU 114 determines that the condition is not satisfied (NO in step 606), the processing proceeds to step 608.

In step 607, the CPU 114 sets a measurement candidate object flag for the target repetitive object. For example, if the CPU 114 determines that an N-th target repetitive object satisfies the measurement interval condition, the CPU 114 sets a measurement candidate object flag Pre_Flag_N to ON(1). On the other hand, in step 608, the CPU 114 does not set a measurement candidate object flag for the target repetitive object to ON. For example, if the CPU 114 determines that an N-th target repetitive object does not satisfy the measurement interval condition, the CPU 114 sets the measurement candidate object flag Pre_Flag_N to OFF(0).

In step 609, the CPU 114 compares the number N of the counter and the number K of repetitive objects so as to determine whether all the repetitive objects have been checked. If the number N of the counter is equal to the number K of repetitive objects (YES in step 609), the CPU 114 determines that all the repetitive objects have been checked, and the processing proceeds to step 505. If the number N of the counter is not equal to the number K of repetitive objects (NO in step 609), the processing returns to step 604. Then, the next repetitive object will be checked. For example, since K=1 regarding the PPML data in FIG. 2, the repetitive object checking process is carried out once.

According to the processing described above, whether a repetitive object is included in a print job is determined. If a repetitive object is not included, the conventional simple density correction is performed. If a repetitive object is included, whether the repetitive object satisfies the interval is determined. After a flag is set, the processing proceeds to the analysis and determination processing of the repetitive object described below with reference to FIG. 7.

Figure 7:
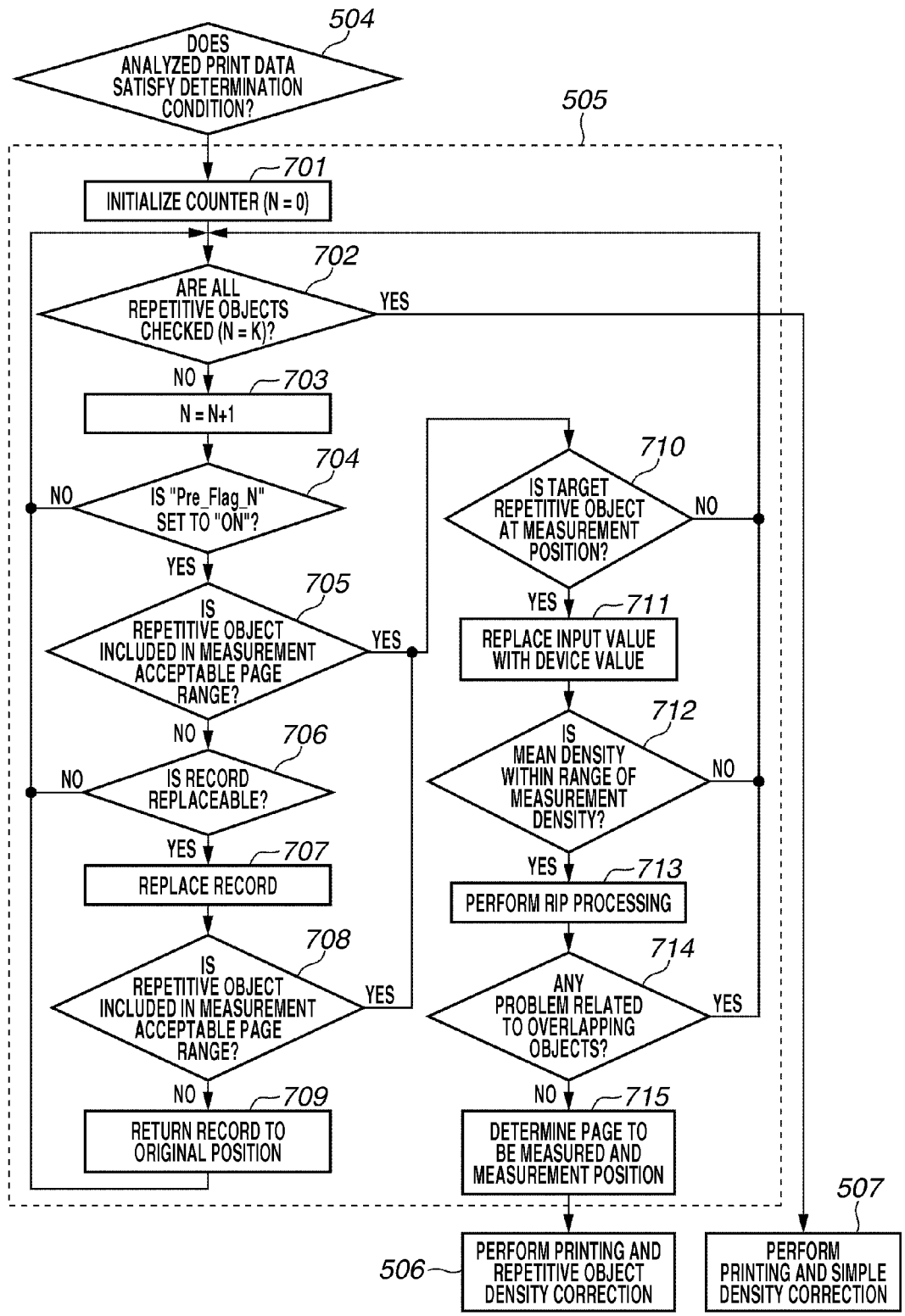
FIG. 7 is a flowchart illustrating detailed processing of analysis and check processing of a repetitive object.

FIG. 7 is a flowchart illustrating the analysis and determination processing of the repetitive object performed in step 505. In step 701, the CPU 114 initializes or sets a number N of the counter to 0. In step 702, the CPU 114 determines whether all the repetitive objects have been checked by comparing the number N of the counter and the number K of repetitive objects. To be more precise, if N is equal to K (YES in step 702), the CPU 114 determines that all the repetitive objects have been checked, and an unchecked repetitive object for the density measurement no longer exists, and then the processing proceeds to step 507. On the other hand, if the number N of the counter is not equal to the number K of repetitive objects (NO in step 702), the processing proceeds to step 703.

In step 703, the CPU 114 increments the number N of the counter by 1 so as to check the next target repetitive object. In step 704 and the subsequent steps, the N-th repetitive object (target repetitive object) being the object to be checked is analyzed and checked.

In step 704, the CPU 114 confirms whether the target repetitive object is a measurement candidate object by checking the measurement candidate object flag Pre_Flag_N. If the measurement candidate object flag Pre_Flag_N is ON (1) (YES in step 704), the target repetitive object is determined to be a measurement candidate object, and the processing proceeds to step 705. On the other hand, if the measurement candidate object flag Pre_Flag_N is OFF(0) (NO in step 704), the target repetitive object is determined not to be a measurement candidate object, and then the processing returns to step 702.

In step 705, the CPU 114 determines whether the target repetitive object is included in the range of the measurement acceptable pages of the measurement positions. For example, regarding the PPML data in FIG. 2, the pages are arranged as illustrated in FIG. 4. In FIG. 4, the first measurement page is page 1 whereas the measurement acceptable page range is from page 1 to page 6.

According to the example illustrated in FIG. 4, the reusable object 304 is used in all the pages. Thus, the CPU 114 determines that the target repetitive object is included in the measurement acceptable page range. Under such circumstances, the CPU 114 sets "1", which represents the first page (page 1), to Reusable_ScanPage_N. Accordingly, Reusable_ScanPage_1 is recorded. Reusable_ScanPage_N is an item that indicates the page which is to be measured in the print job and which includes the N-th repetitive object. It is desirable to record a page closest to the measurement page in the measurement acceptable page range.

Next, the CPU 114 confirms whether a target repetitive object is included in the range between 5 pages before and after page 101. Page 101 is located 100 pages (measurement interval) after the first measurement page (page 1). In other words, the CPU 114 confirms whether the target repetitive object is included in the measurement acceptable page range from page 96 to page 106. Since the target repetitive object is printed on page 101 as illustrated in FIG. 4, the CPU 114 sets "101" to Reusable_ScanPage_N. Accordingly, Reusable_ScanPage_101 is recorded. The above-described confirmation is performed with respect to all the measurement acceptable page range. Because the target repetitive object is used in the measurement acceptable page range, the CPU 114 determines that the target repetitive object is included in the range of the measurement acceptable pages of the measurement positions (YES in step 705), and then the processing proceeds to step 710.

On the other hand, if the target repetitive object is not used in all the measurement acceptable page range (NO in step 705), the CPU 114 determines that the target repetitive object is not included in the range of the measurement acceptable pages of the measurement positions, and the processing proceeds to step 706.

Figure 9:
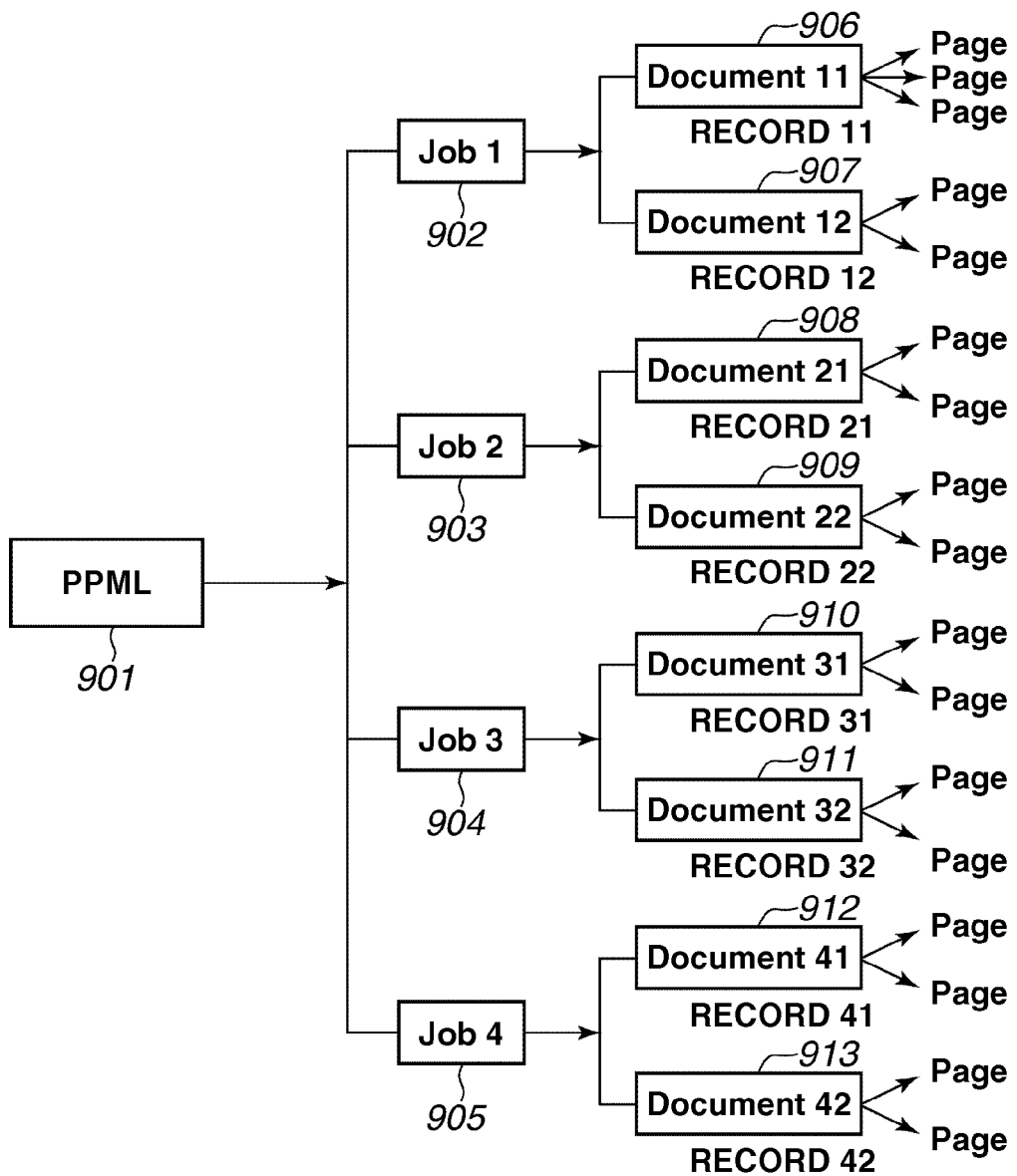
FIG. 9 illustrates an example of PPML data.

In the description above, the repetitive object is included in the measurement acceptable page range. Next, a case where the repetitive object is not included in the measurement acceptable page range will be described. FIG. 9 illustrates a data structure of PPML 901. Regarding the data structure, printed materials (direct mails) of each of job 1 (902), job 2 (903), job 3 (904), and job 4 (905) need to be processed together since each job has a unique mail destination. Since record 11 (906) and record 12 (907) in the job 1 (902) are delivered to the same destination, the records are contained in the same job, and therefore the records are inseparable.

Figure 10:
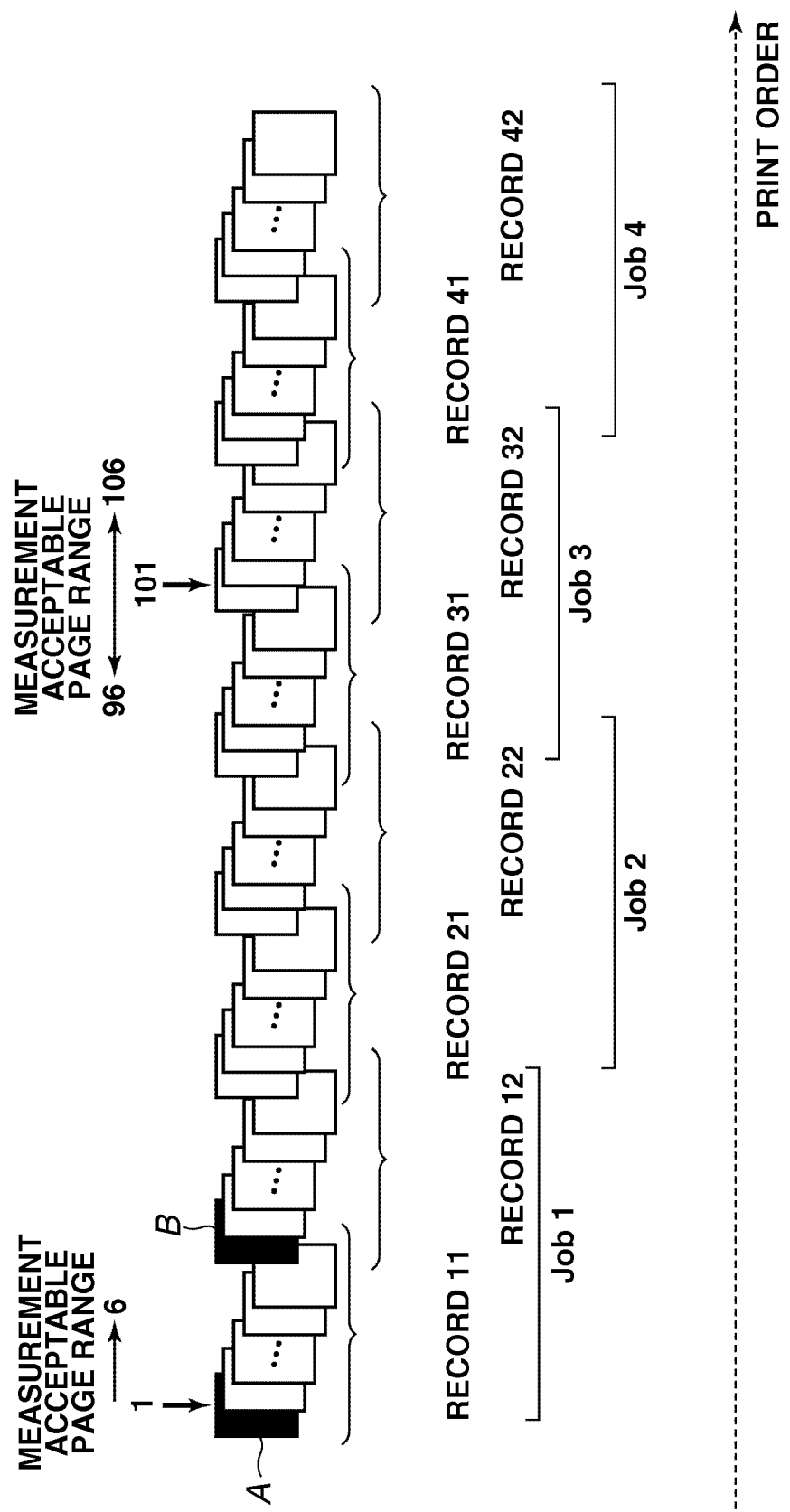
FIG. 10 illustrates an example of a page arrangement.

The PPML data in FIG. 9 is arranged, for example, as illustrated in FIG. 10. In this case, since the measurement acceptable page range is from page 1 to page 6, and the repetitive object is in that range in page 1, the CPU 114 sets "1" to Reusable_ScanPage_N. Accordingly, Reusable_ScanPage_1 is recorded in step 705. Next, the CPU 114 confirms whether the target repetitive object is included in the range between 5 pages before and after page 101. Page 101 is located 100 pages (measurement interval) after the first measurement page (page 1). In other words, the CPU 114 confirms whether the target repetitive object is included in the measurement acceptable page range from page 96 to page 106. Since the repetitive object is not included in the measurement acceptable page range (pages 96 to 106) (NO in step 705), the processing proceeds to step 706.

In step 706, the CPU 114 determines whether it is possible to swap a record in a measurement acceptable page range with a record that includes the target repetitive object. Such a case will be described with reference to FIG. 10. In FIG. 10, each of pages A and B includes a target repetitive object. It is desirable to be able to move these pages to a measurement acceptable page range. At this time, since page A is already in the measurement acceptable page range, record 12, which includes page B, needs to swap record 31 or 32 in the next measurement acceptable page range. However, regarding the print job illustrated in FIG. 10, since the records 31 and 32 belong to the same job, these records are not swappable by records of a different job. In such a case, the CPU 114 determines that the record cannot be swapped (NO in step 706), and the processing returns to step 702.

Next, a case where pages C and D, each of which includes a target repetitive object, are moved to a measurement acceptable page range will be described with reference to FIG. 11. At this time, since page C is already in a measurement acceptable page range, record 31, which includes page D, needs to swap record 32 in the next measurement acceptable page range. Regarding the print job illustrated in FIG. 11, since the records 31 and 32 belong to the same job, these records are swappable. In such a case, the CPU 114 determines that the record can be swapped (YES in step 706), and the processing proceeds to step 707.

In step 707, the CPU 114 swaps the record determined in step 706 with the record including the target repetitive object. In step 708, the CPU 114 confirms whether the page including the target repetitive object is included in the range of the measurement acceptable pages of the measurement positions with respect to the print job after the swapping. This processing is the same as the processing performed in step 705.

Figure 11:
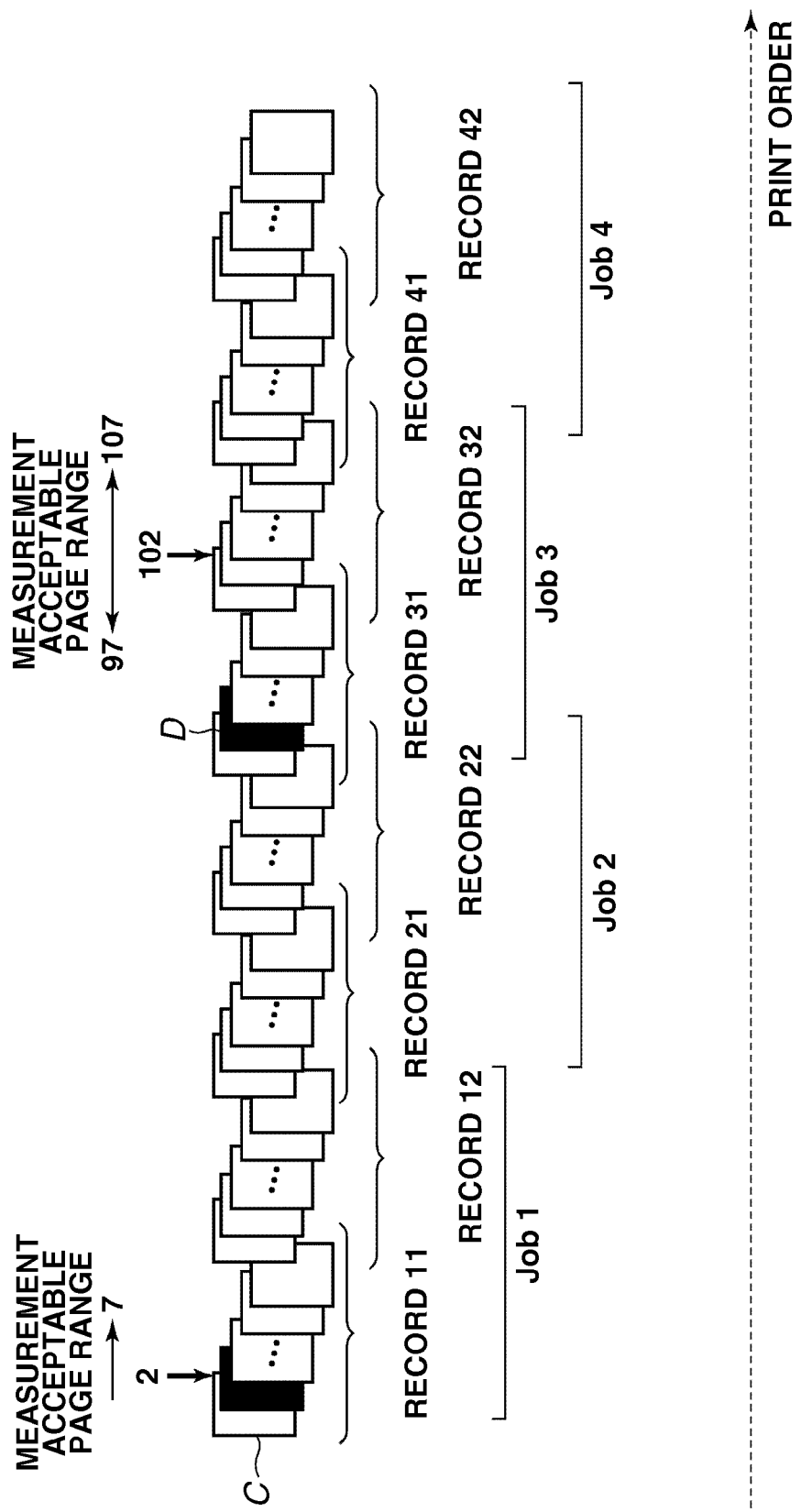
FIG. 11 illustrates an example of a page arrangement.
Figure 12:
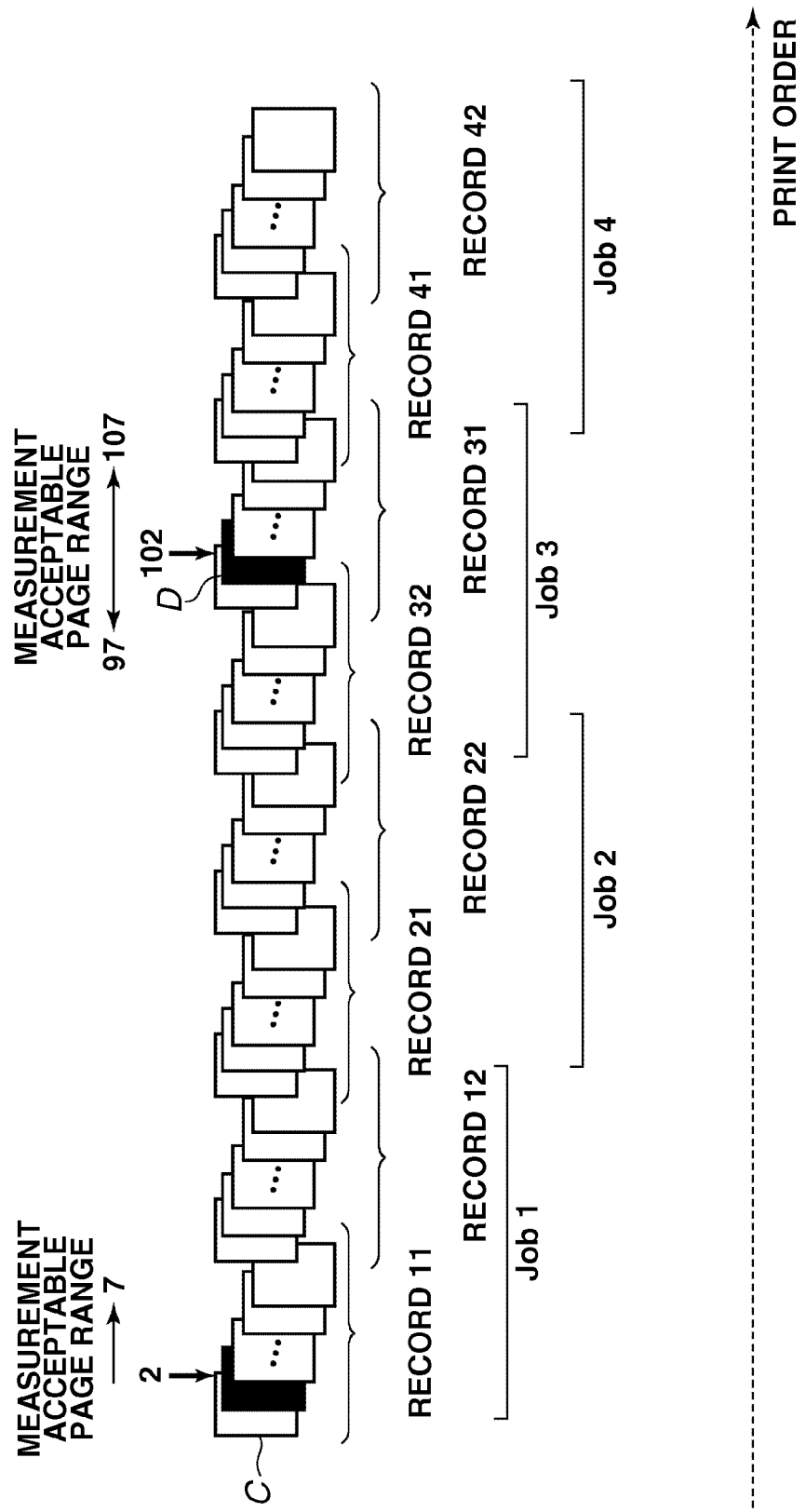
FIG. 12 illustrates an example of a page arrangement.

FIG. 12 illustrates the arrangement of the records regarding the print job illustrated in FIG. 11 after the record 32 is swapped by the record 31. According to the swapping of the records, page D which had been out of the range of the measurement acceptable pages is moved to page 102 and is included in the measurement acceptable pages after the swapping. Thus, in this case, the CPU 114 determines that the target repetitive object is within the range of the measurement acceptable pages of the measurement positions (YES in step 708), and after setting "102" to Reusable_ScanPage_N, the processing proceeds to step 710.

Figure 13:
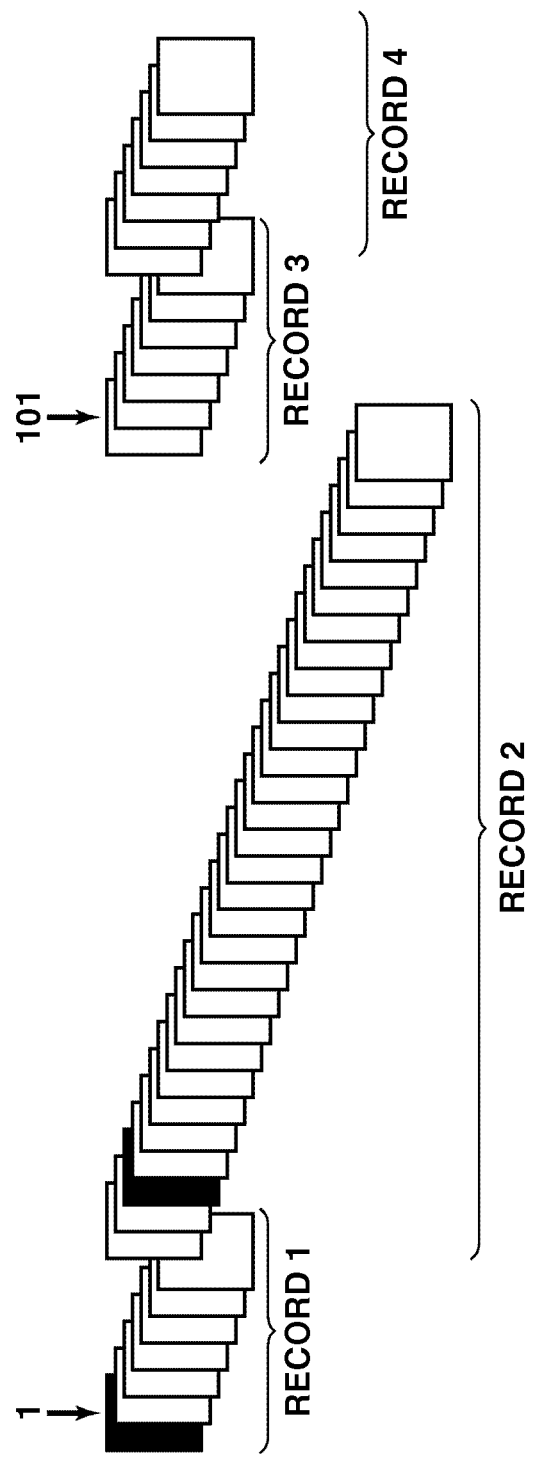
FIG. 13 illustrates an example of a page arrangement.
Figure 14:
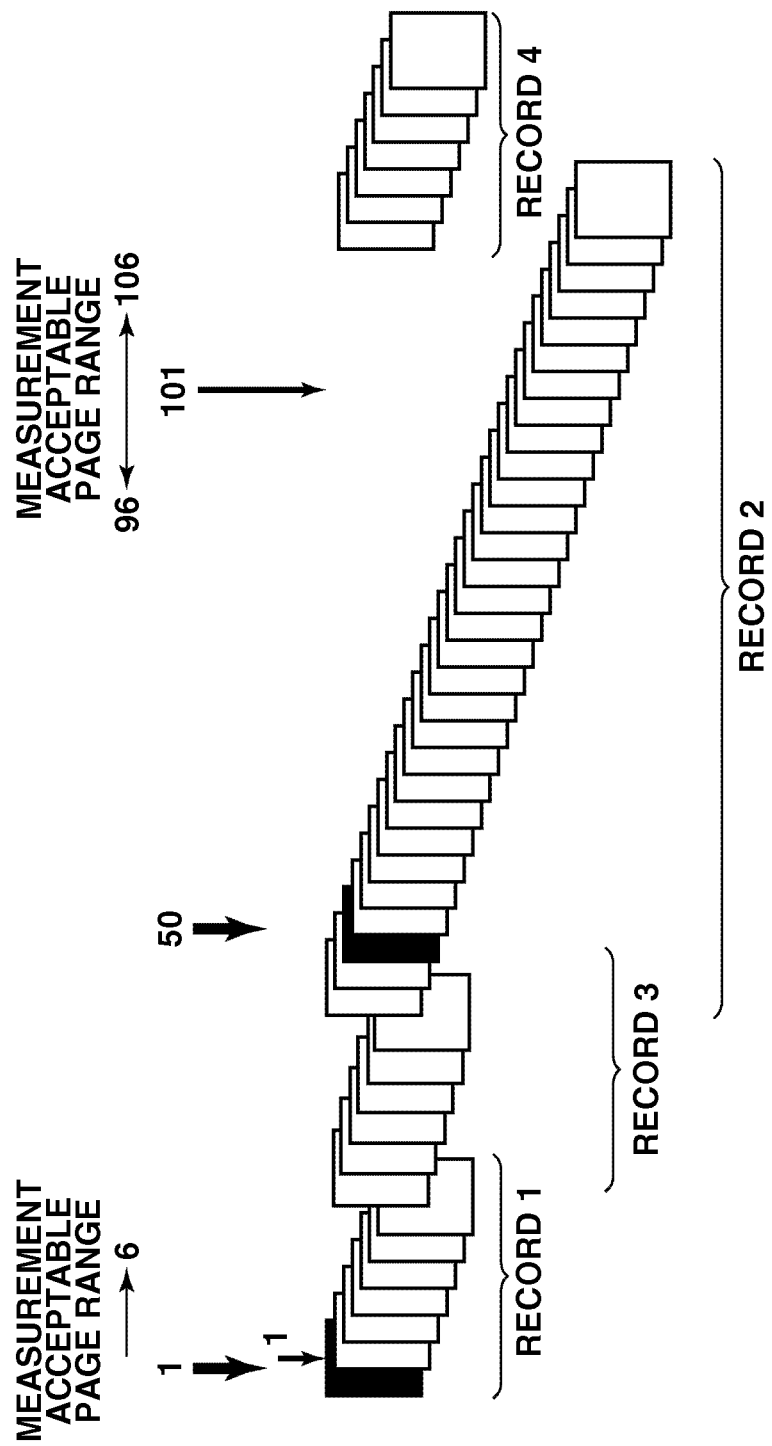
FIG. 14 illustrates an example of a page arrangement.

On the other hand, if the CPU 114 determines that the target repetitive object is not in the range of the measurement acceptable pages of the measurement positions with respect to the print job after the swapping of the record (NO in step 708), the processing proceeds to step 709. Examples of such a case are illustrated in FIGS. 13 and 14. FIG. 13 illustrates the print job before the record swapping. FIG. 14 illustrates the print job after the record swapping. In FIGS. 13 and 14, the black pages include the target repetitive object.

Regarding the records illustrated in FIG. 13, if record 3 in the measurement acceptable pages is swapped with record 2 including the target repetitive object, the pages will be arranged as illustrated in FIG. 14. Since record 2 includes many pages, in spite of the swapping, the page including the target repetitive object is not included in the measurement acceptable pages. In such a case, the CPU 114 determines that the target repetitive object is not in the range of the measurement acceptable pages of the measurement positions with respect to the print job after the swapping of the record.

In step 709, the CPU 114 returns the record which has been swapped in step 707 to its original position, and then the processing returns to step 702.

In step 710 and subsequent steps, after the CPU 114 has determined in step 705 or 708 that the target repetitive object is within the range of the measurement acceptable pages of the measurement positions and Reusable_ScanPage_N is recorded, the CPU 114 performs determination processing of the measurement position.

In step 710, the CPU 114 determines whether the target repetitive object is at a position (measurement portion) measurable by the measurement unit. If the CPU 114 determines that the target repetitive object is at the measurement portion (YES in step 710), the processing proceeds to step 711. If the CPU 114 determines that the target repetitive object is not at the measurement portion (NO in step 710), the processing returns to step 702.

Next, a case where the target repetitive object exists or does not exist at the measurement portion will be described with reference to FIGS. 15A, 15B, 16A, and 16B. According to the descriptions below, a monochromatic image will be used so as to simplify the descriptions.

Figures 15A, 15B:
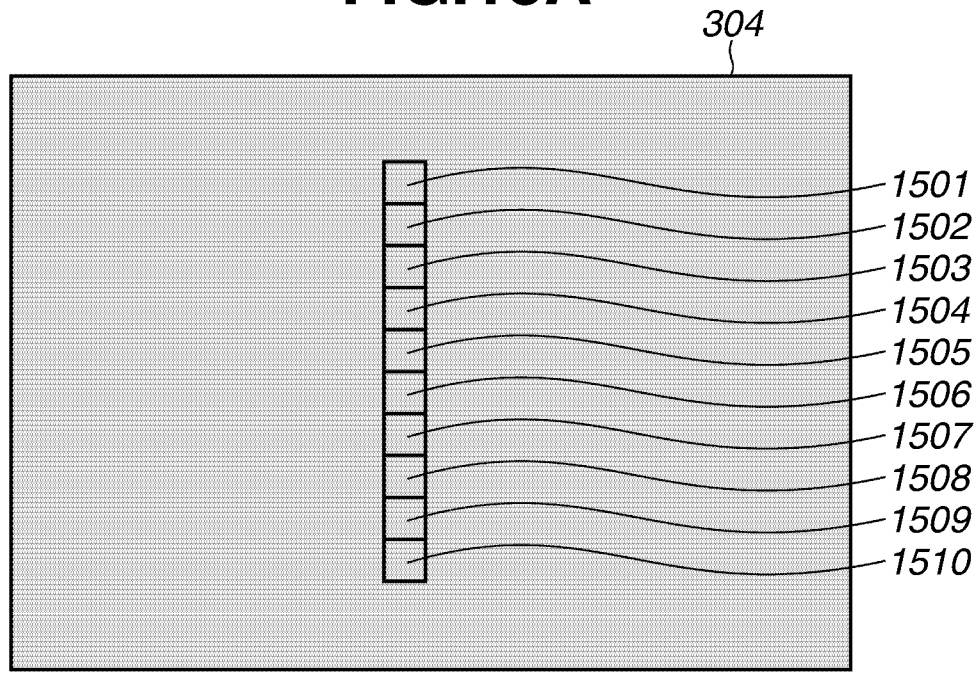
FIGS. 15A and 15B illustrate examples of a repetitive object and a measurement position.

FIG. 15A illustrates measurement portions 1501 to 1510 that overlap the reusable object 304 illustrated in FIG. 3. The measurement portions 1501 to 1510 are measured by the measurement unit 118 and are set at a center portion of the page. This is because the density is generally more stable at the center portion.

In step 710, the CPU 114 acquires a mean density of the measurement portions 1501 to 1510. If a value is obtained, the CPU 114 determines that an object exists at the measurement portions. FIG. 15B is a table illustrating a determination result of the measurement portions illustrated in FIG. 15A. As illustrated in the table, the mean density of each of the measurement portions 1501 to 1510 is 100. Accordingly, it is determined that all of the measurement portions have the target repetitive object.

Figures 16A, 16B:
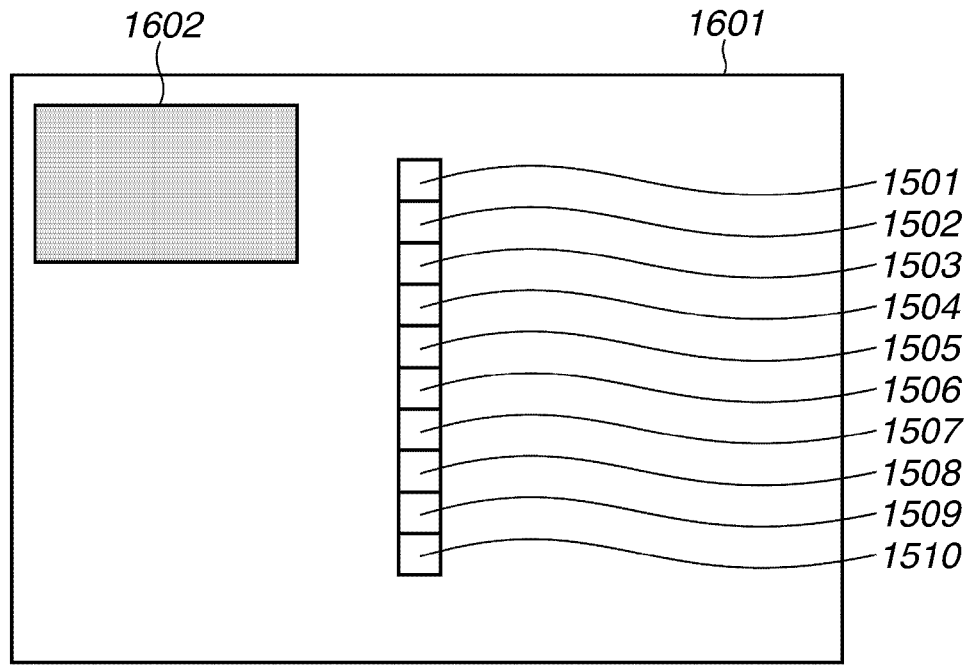
FIGS. 16A and 16B illustrate examples of a repetitive object and a measurement position.

FIG. 16A is an example of a target repetitive object 1602 included in a page 1601. In this case, since the target repetitive object 1602 is out of the range of the measurement portions 1501 to 1510, as the table in FIG. 16B shows, it is determined that the target repetitive object is not included in any of the measurement portions.

In step 711, the CPU 114 converts the input value into a device value as needed. Since a monochromatic color space for a monochromatic device is used in the example, conversion is not performed. If a color space such as the red-green-blue (RGB) color space is used, conversion to the monochromatic device will be performed.

In step 712, the CPU 114 determines whether the mean density of the measurement portions of the target object to be measured is within a measurement density range. The measurement density range is defined in advance according to the performance of the print engine. For example, regarding gradation data, if a low-density area of a highlight portion is easily washed out and a high-density area of a dark portion is covered in shadow, density of a medium degree, from 80 to 120, will be used as the range of the measurement density.

In step 712, the CPU 114 determines whether the mean density is within the range of the measurement density. If the CPU 114 determines that the mean density is within the range of the measurement density (YES in step 712), the processing proceeds to step 713. If the CPU 114 determines that the mean density is not within the range of the measurement density (NO in step 712), the processing returns to step 702. For example, regarding the example illustrated in FIG. 15A, since the mean density is 100 as illustrated in the table in FIG. 15B, it is determined that the mean density of each of the measurement portions 1501 to 1510 is within the range of the measurement density.

In step 713, the CPU 114 controls the RIP 111 so that the page including the target repetitive object undergoes RIP processing. As a result, a bitmap image is generated. If RIP processing has been completed for each page, a bitmap image, which has already been generated, can be acquired.

In step 714, the CPU 114 determines whether overlapping of the target repetitive object and another object causes any measurement problems. Actually, not only the density of the overlapping area of the target repetitive object is measured. For example, density of an overlapping area of an object such as a character is also measured. Thus, it is necessary to determine whether it is possible to measure the density of the page including overlapping objects.

Figures 17A, 17B:
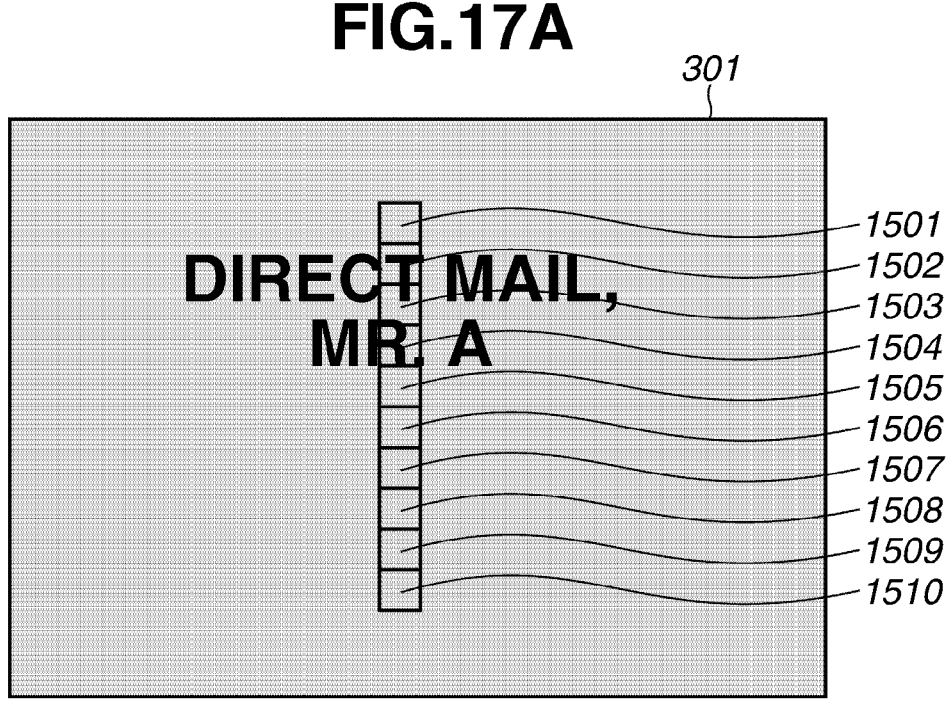
FIGS. 17A and 17B illustrate examples of a repetitive object page and a measurement position.

An example of the determination in step 714 will be described with reference to FIGS. 17A and 17B. FIG. 17A illustrates page 301 in FIG. 3. Page 301 includes the target repetitive object 304 and the variable object 305. FIG. 17B illustrates a table of the determination result. According to this table, mean density before the overlapping and mean density after the overlapping are compared for each measurement portion. If a difference is detected, the CPU 114 determines that the target repetitive object and another object overlap at the measurement portion and thus the measurement is not possible.

According to the example illustrated in FIG. 17B, the measurement portions 1502 to 1504 are the overlapping areas and thus determined as not measurable. On the other hand, overlapping is not seen in the measurement portions 1501 and 1505 to 1510. Thus, these portions are determined as measurable. The CPU 114 performs such determination with respect to all the pages recorded as Reusable_ScanPage_N. Then, because a measurement portion which is determined as measurable in the pages exists, according to the determination in step 714, the CPU 114 determines that the overlapping of the target repetitive object and the another object does not affect the measurement (NO in step 714), and the processing proceeds to step 715.

On the other hand, if a measurement portion which is determined as measurable in all the pages does not exist, the CPU 114 determines that the overlapping of the target repetitive object and another object affects the measurement (YES in step 714), and the processing returns to step 702. The CPU 114 determines that the processing in step 714 has a problem if, for example, all the measurement portions of any of the determined pages are determined as not measurable or the measurement portion which is determined as measurable is changed for each page and thus measurement of a same measurement portion is not determined as measurable.

In step 715, the CPU 114 determines the measurement page whose density is to be measured by the density measurement unit 118 and a measurement position indicating which of the measurement portions of the measurement page is to be measured. To be more specific, a value of Reusable_ScanPage_N of the current target repetitive object is recorded in Reusable_ScanPage which indicates the measurement page. Further, a number of the measurement portion measurable for all measurement pages is recorded in Reusable_ScanPoint which indicates the measurement position. For example, a case where a total of two measurement pages (a first measurement page and a second measurement page) are determined will be described. If the measurement portions 1501, 1509, and 1510 of the first measurement page are measurable and the measurement portions 1507, 1508, and 1509 of the second measurement page are measurable, then the measurement portion 1509 which is measurable for both of the first and the second measurement pages will be recorded.

In step 715, the CPU 114 determines the measurement page and the measurement position. Then, the processing proceeds to step 506. According to the present embodiment, if one type of the target repetitive object is determined, subsequent density correction will be performed based on the measurement page including the determined target repetitive object. The density correction method, however, is not limited to such a method. For example, a measurement page which is most appropriate out of various measurement pages can be determined by checking all of the target repetitive objects.

Figures 18A, 18B:
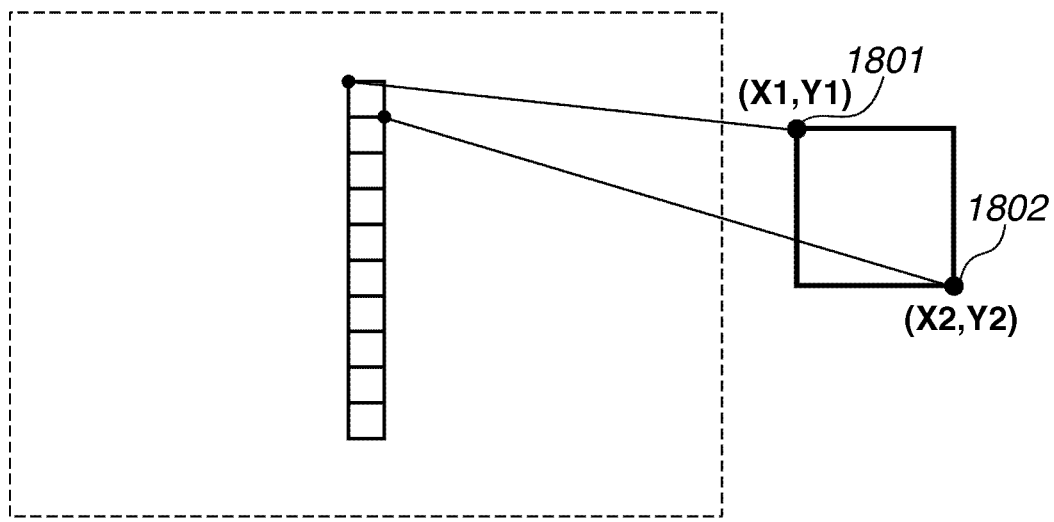
FIGS. 18A and 18B illustrate examples of a measurement position.

Actually, as illustrated in FIG. 18A, coordinates of the output image corresponding to Reusable_ScanPoint of the measurement position are defined as a start point 1801 and an end point 1802. The printed material is measured by the measuring apparatus at timing that matches the coordinates. FIG. 18B is a table illustrating an example of the coordinates defined by each measurement portion.

According to the processing described above, whether the target repetitive object is appropriate for measuring the density used for the density correction is determined. Then, from the page which is determined as a page including a repetitive object appropriate for the measurement for the density correction, a measurement page and a measurement position of the measurement page are determined. In this manner, the conditions for measuring density variation using a repetitive object will be set in the program, and in step 506, the repetitive object density correction is performed based on the defined conditions.

Figure 8:
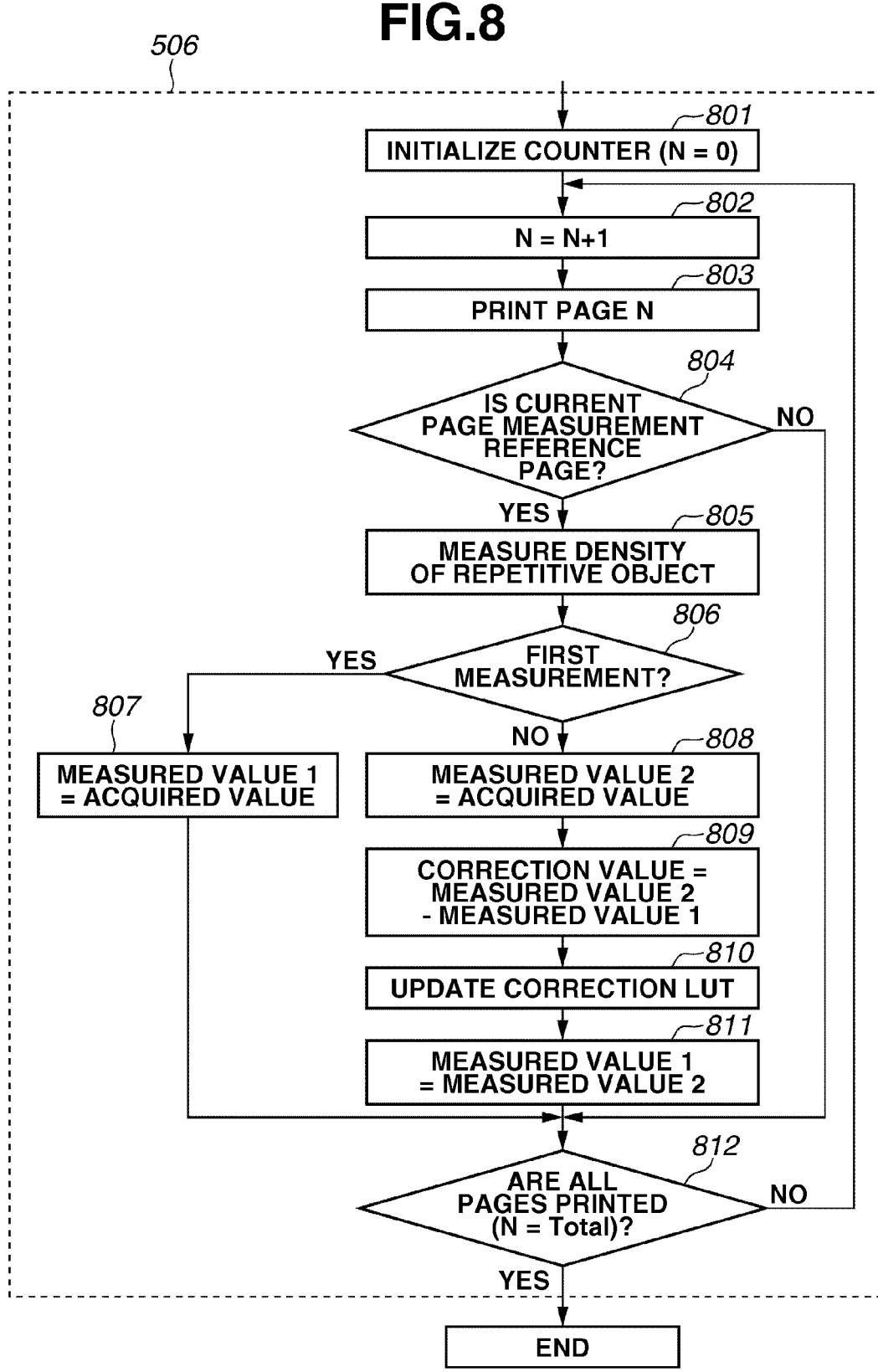
FIG. 8 is a flowchart illustrating detailed processing of printing and repetitive object density correction.

FIG. 8 is a detailed flowchart illustrating printing processing and density correction processing of a repetitive object performed in step 506. In step 801, the CPU 114 initializes a number N of the counter (N=0). In step 802, the CPU 114 increments the number N of the counter by 1. In step 803, the CPU 114 instructs the print engine 117 to print the N-th page.

In step 804, the CPU 114 determines whether the current page is the measurement page by referring to Reusable_ScanPage recorded in step 715 in FIG. 7. If the CPU 114 determines that the current page is the measurement page (YES in step 804), the processing proceeds to step 805. If the CPU 114 determines that the current page is not the measurement page (NO in step 804), the processing proceeds to step 812. In step 805, the CPU 114 refers to Reusable_ScanPoint recorded in step 715 in FIG. 7 and confirms the measurement position. Then, the CPU 114 measures the density of the repetitive object of the page printed by the measurement unit 118 by referring to the measurement coordinates illustrated in FIG. 18B.

In step 806, the CPU 114 determines whether the measurement is the first measurement. If the CPU 114 determines that the measurement is the first measurement (YES in step 806), the processing proceeds to step 807. If the CPU 114 determines that the measurement is not the first measurement (NO in step 806), the processing proceeds to step 808.

In step 807, the CPU 114 sets the measured value acquired in step 805 to measured value 1. In step 808, the CPU 114 sets the measured value acquired in step 805 to measured value 2.

In step 809, the CPU 114 obtains a density correction value from equation (1) below. If a plurality of measurement positions are included, a density correction value of each position is acquired and a mean value of the obtained density correction values will be used as the final density correction value. In this manner, measurement errors can be reduced.

$$\text{Correction value} = \text{Measured value 2} - \text{Measured value 1} \quad (1)$$

In step 810, the CPU 114 acquires the density adjustment value according to a relation between the density correction value and the density adjustment value defined in advance. FIG. 19 is a table illustrating an example of the values and their relation. The CPU 114 changes the density according to the density adjustment value which corresponds to the obtained density correction value in the lookup table (LUT). In this manner, if the density correction value is large, the density will be decreased. On the other hand, if the correction value is small, the density will be increased. Thus, output of a constant density can be obtained.

In step 811, the CPU 114 sets the measured value 2 to the measured value 1 so that it can be used for the next correction value measurement.

In step 812, the CPU 114 determines whether all the pages have been printed by comparing the number N and the total number of pages to be printed (Total). If N is not equal to Total (NO in step 812), the processing returns to step 802 for the printing of the next page. If N is equal to Total (YES in step 812), since all the pages are printed, the processing ends.

As described above, by directly reading a printed material including a repeatedly-used object, density variation can be accurately corrected without using extra toner or print paper. By using the features of VDP, even if a repetitive object is not included in a measurement page, the measurement becomes possible as the record is swapped.

According to the description above, although PPML data has been described as the VDP data of a print job, however, VDP data of other type can also be used. For example, PDF/VT data is also applicable to the present invention, and a similar effect can be obtained.

The repetitive object can be repeatedly used not only in one piece of PPML data. For example, according to a global object, if a repetitive object is once registered in the printer 108, the object can be also referenced from other PPML data (print job). According to a second embodiment of the present invention, this global repetitive object will be described. According to the present embodiment, since a system similar to the one used in the first embodiment will be used, descriptions of the components of the system are not repeated. Further, as for the processing of the global object, portions similar to the processing of the first embodiment are denoted by the same step numbers and their descriptions are not repeated.

Figure 20:
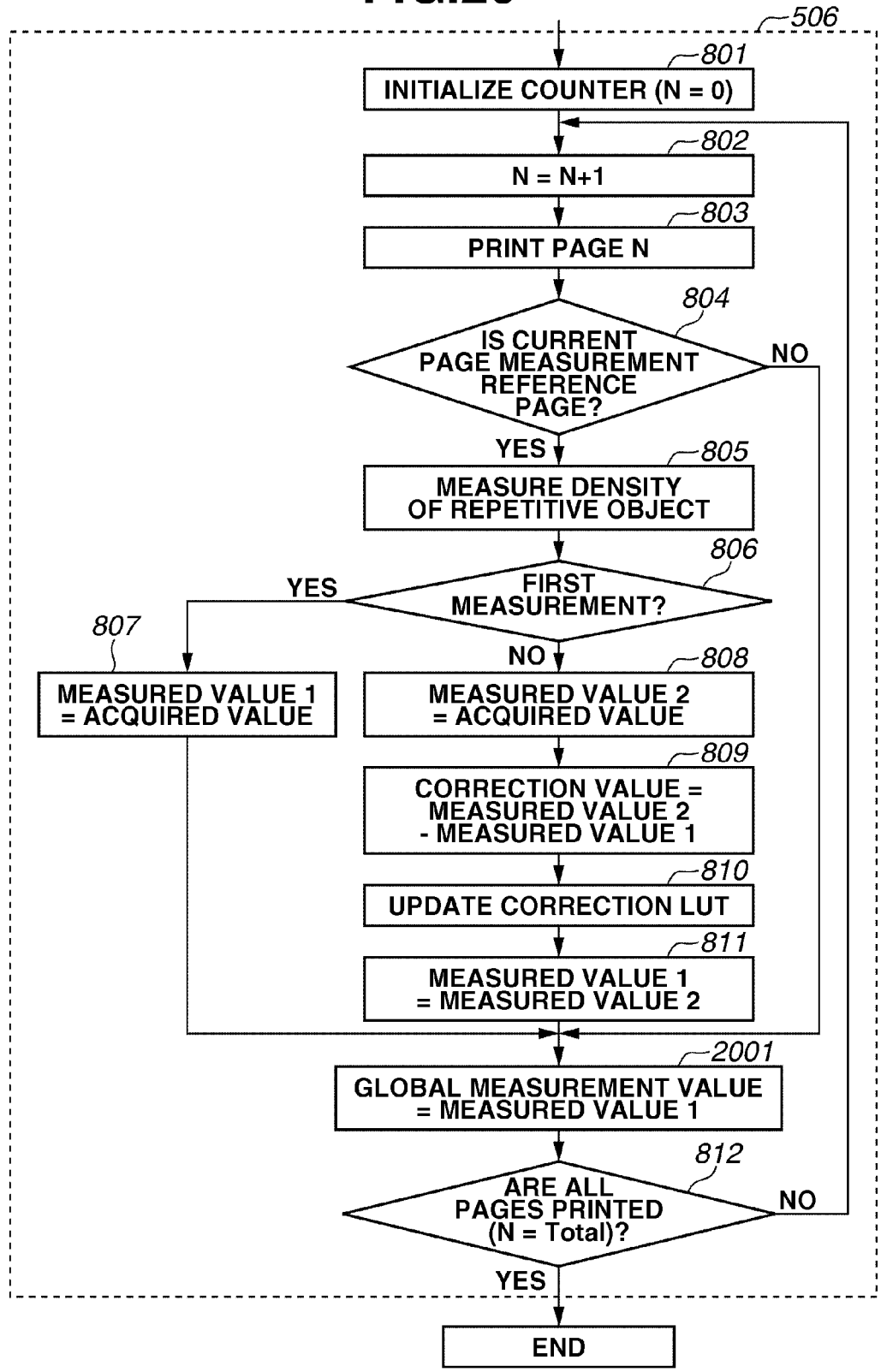
FIG. 20 is a detailed flowchart illustrating global repetitive object density correction processing.

FIG. 20 is a flowchart illustrating processing which can utilize a value of a global repetitive object for the next measurement. Since the basic processing is similar to the processing illustrated in FIG. 8, descriptions of the similar portions are not repeated.

The CPU 114 executes the processing in FIG. 20 when a global measurement value is not set. The flowchart in FIG. 20 is based on the flowchart illustrated in FIG. 8 but further includes step 2001. In step 2001, the CPU 114 sequentially stores the acquired measured value 1 as the global measurement value. In this manner, the CPU 114 can store the most recently acquired measurement value of the print data. Next, the CPU 114 performs the processing in FIG. 21 while the global measurement value is being set.

Figure 21:
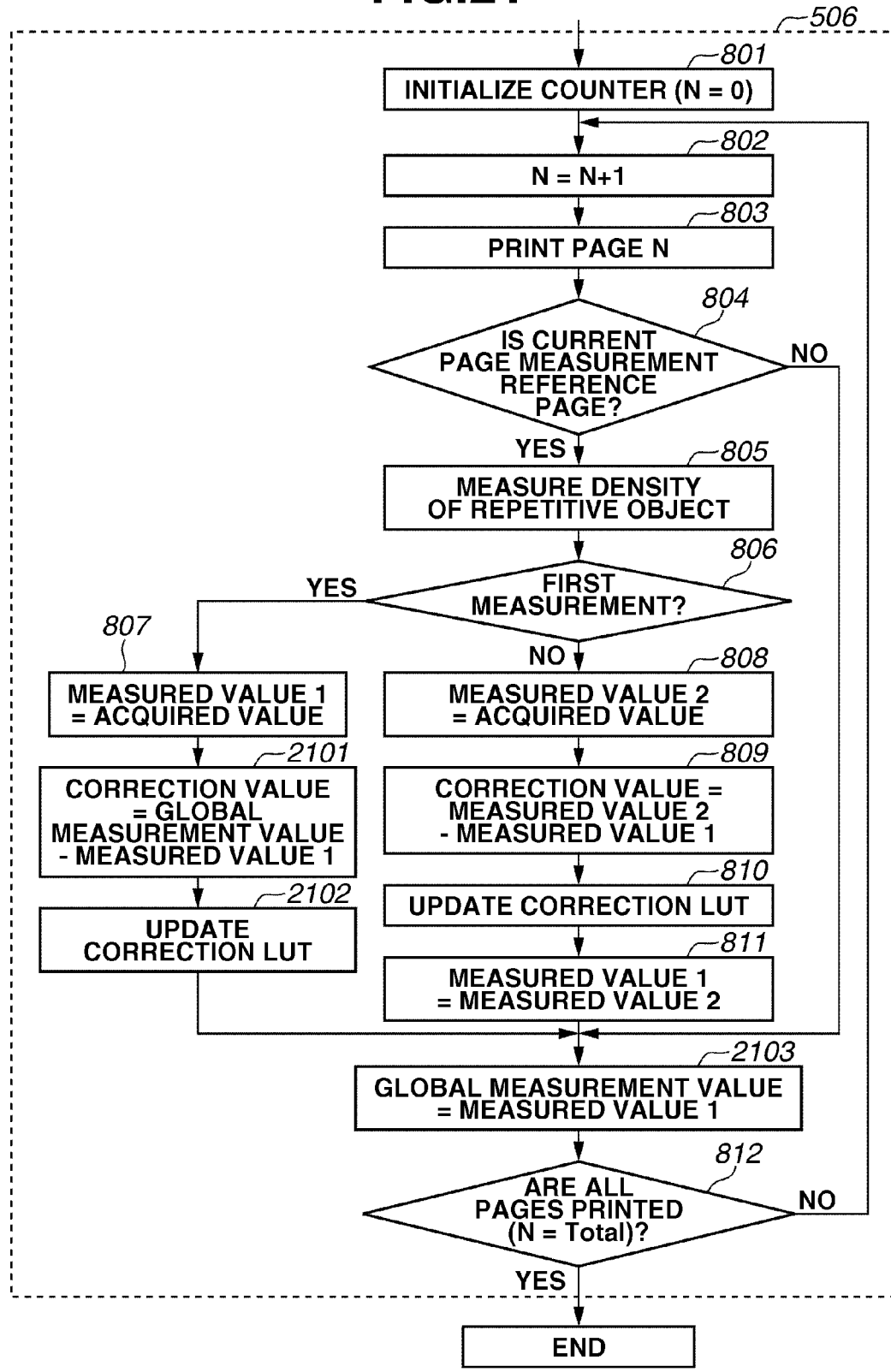
FIG. 21 is a detailed flowchart illustrating global repetitive object density correction processing.

FIG. 21 is a flowchart illustrating processing of data when data of a repetitive object whose measurement value has been stored as the global measurement value in FIG. 20 is submitted to the printer 108. Regarding the flowchart in FIG. 20, a measured value which can be used for the comparison of the density variation is not available. Accordingly, the CPU 114 does not perform the correction. However, regarding the flowchart in FIG. 21, since the global measurement value which has been previously acquired is stored, the CPU 114 can acquire the correction value. In other words, in step 2101, the CPU 114 acquires the correction value from the global measurement value and the measured value 1. In step 2102, as described above according to the first embodiment, the CPU 114 rewrites the correction LUT. Further, in step 2103, since the CPU 114 sequentially stores the acquired measured value 1 as the global measurement value, density correction can be performed with respect to the next data according to the flowchart in FIG. 21.

Figure 22:
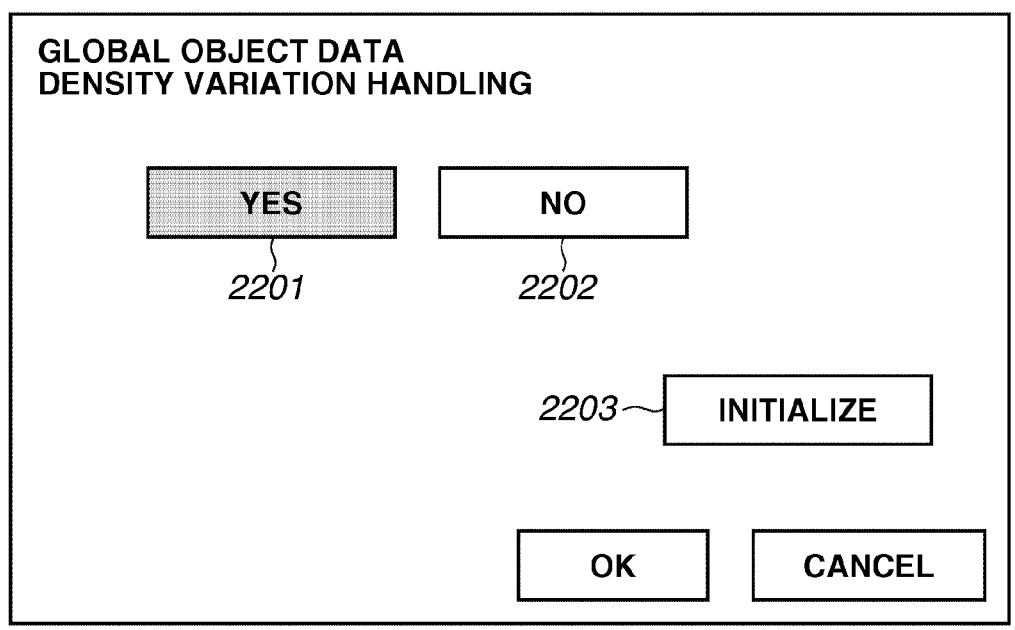
FIG. 22 illustrates a user interface (UI) according to an embodiment of the present invention.

Although a case where the density variation is corrected by using the global data is described above, the user does not always desire to correct the density variation using the previous data. For example, if the same repetitive object is printed a number of times when gradation calibration is performed, the repetitive objects are likely to have different density. FIG. 22 illustrates a screen of the UI 113. If such a screen is displayed, the user can initialize the global measurement value by selecting an initialization button 2203. Accordingly, the CPU 114 initializes the global measurement value. Then, since the global measurement value is set to "0", the density correction processing in FIG. 20 will be performed.

Further, if the user selects "No" on the screen of the UI 113 in FIG. 22, handling of density variation of the global object is not performed. Thus, the initialization will not be performed each time the gradation data calibration is performed. Accordingly, the user can set settings that match the user's preference.

By using the global repetitive object which is closely correlated with the data, density variation of each piece of data can be corrected. Further, since density correction of data is not performed, and previous data can be initialized, settings that reflect the user's preferences can be realized.

According to the embodiments of the present invention, by performing density measurement by using a printed material of a repetitive object, density variation can be easily corrected with accuracy without using extra toner or print paper.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to embodiments, it is to be understood that the invention is not limited to the disclosed exemplary embodiments. It will of course be understood that this invention has been described above by way of example only, and that modifications of detail can be made within the scope of this invention.

This application claims priority from Japanese Patent Application No. 2010-201084 filed Sep. 8, 2010, which is hereby incorporated by reference herein in its entirety.

What is claimed is:

1. An image processing apparatus comprising:
 a printing unit configured to print a print job including a repetitive object, which is repeatedly used in a plurality of pages;
 a determination unit configured to determine whether the repetitive object is measurable for density correction by checking if the repetitive object and another object overlap;
 a decision unit configured to decide, from pages including the repetitive object determined as measurable for the density correction, a plurality of measurement pages to be measured for the density correction and a measurement position in the measurement pages;

a measurement unit configured to measure density of the measurement position in the measurement pages printed by the printing unit; and a density correction unit configured to perform the density correction according to the measured density in the measurement pages for a page different from the measurement pages.

2. The image processing apparatus according to claim 1, wherein if a number of pages on which the repetitive object is printed by the print job satisfies a measurement interval of the density correction, the determination unit is configured to determine that the repetitive object is measurable for the density correction.

3. The image processing apparatus according to claim 1, wherein the determination unit is configured to determine that, if a page on which the repetitive object is printed is within a range accepted as a page to be measured for the density correction, the repetitive object is measurable for the density correction.

4. The image processing apparatus according to claim 3, further comprising a swapping unit configured, if the page on which the repetitive object is printed is not within the range accepted as a page to be measured for the density correction, to move the page on which the repetitive object is printed to within the range accepted as a page to be measured for the density correction by replacing a record included in the print job with the record including the page on which the repetitive object is printed.

5. The image processing apparatus according to claim 1, wherein, if the repetitive object is at a position measurable by the measurement unit, the determination unit is configured to determine that the repetitive object is measurable for the density correction.

6. The image processing apparatus according to claim 1, wherein, if density of the repetitive object is within a range of measurement density which is measured for the density correction, the determination unit is configured to determine that the repetitive object is measurable for the density correction.

7. The image processing apparatus according to claim 1, wherein, if overlapping of the repetitive object and another object in a page does not cause a problem concerning density measurement, the determination unit is configured to determine that the repetitive object is measurable for the density correction.

8. The image processing apparatus according to claim 1, wherein the decision unit is configured to decide, as the measurement position, a position measurable by the measurement unit on all of the plurality of measurement pages.

9. A non-transitory computer-readable storage medium storing a program which, when executed on a device, causes the device to act as an image processing apparatus according to claim 1.

10. A method for controlling an image processing apparatus including a printing unit configured to print a print job including a repetitive object, which is repeatedly used in a plurality of pages, the method comprising:

determining whether the repetitive object is a repetitive object measurable for density correction by checking if the repetitive object and another object overlap;

deciding a plurality of measurement pages to be measured for the density correction and a measurement position in the measurement pages, from pages including the repetitive object determined as measurable for the density correction;

measuring density of the measurement position in the measurement pages printed by the printing unit; and performing the density correction according to the measured density in the measurement pages for a page different from the measurement pages.

* * * * *